United States Patent
Gauvreau, Jr.

(10) Patent No.: US 10,628,454 B2
(45) Date of Patent: Apr. 21, 2020

(54) RELATIONAL BLOCKCHAIN DATABASE

(71) Applicant: BlockPoint Systems Inc., Rancho Santa Fe, CA (US)

(72) Inventor: Paul Richard Gauvreau, Jr., Rancho Santa Fe, CA (US)

(73) Assignee: BLOCKPOINT SYSTEMS INC., Rancho Santa Fe, CA (US)

( * ) Notice: Subject to any disclaimer, the term of this patent is extended or adjusted under 35 U.S.C. 154(b) by 0 days.

(21) Appl. No.: 16/352,753

(22) Filed: Mar. 13, 2019

(65) Prior Publication Data

US 2020/0050613 A1 Feb. 13, 2020

Related U.S. Application Data

(63) Continuation-in-part of application No. 15/920,423, filed on Mar. 13, 2018.
(Continued)

(51) Int. Cl.
*G06F 16/28* (2019.01)
*G06F 16/27* (2019.01)
*H04L 9/06* (2006.01)

(52) U.S. Cl.
CPC ............ *G06F 16/284* (2019.01); *G06F 16/27* (2019.01); *H04L 9/0637* (2013.01); *H04L 9/0643* (2013.01); *H04L 2209/38* (2013.01)

(58) Field of Classification Search
None
See application file for complete search history.

(56) References Cited

U.S. PATENT DOCUMENTS

| | | | |
|---|---|---|---|
| 9,569,771 B2 | 2/2017 | Lesavich et al. | |
| 9,979,718 B2 | 5/2018 | Kurian | |

(Continued)

FOREIGN PATENT DOCUMENTS

| | | | |
|---|---|---|---|
| AU | 2017100968 A4 | 7/2016 | |
| AU | 2017101623 A4 | 11/2017 | |

(Continued)

OTHER PUBLICATIONS

Health, "Code your own blockchain in less than 200 lines of Go!," Jan. 29, 2018 (Year: 2018).*

(Continued)

*Primary Examiner* — Usmaan Saeed
*Assistant Examiner* — Yu Zhao
(74) *Attorney, Agent, or Firm* — Nicholson De Vos Webster & Elliott LLP

(57) ABSTRACT

A user relational blockchain database includes a set of system-defined user blockchains and user-defined blockchains. The set of system-defined user blockchains includes metadata for managing the user-defined blockchains. Each user-defined blockchain includes a set of fields defined by a user and at least some of the fields are relatable. A command is received to write data that includes an identification of a first user-defined blockchain, a field, and a value. A new block is generated that includes the value set for the field. The new block is transmitted to a network of servers for consensus to add to the first user-defined blockchain. The new block is persisted to the first user-defined blockchain. A command is received to read data from the user relational blockchain database that includes an identification of the first user-defined blockchain and an identification of a field. The value corresponding to the field is accessed and returned.

21 Claims, 16 Drawing Sheets

Related U.S. Application Data

(60) Provisional application No. 62/715,739, filed on Aug. 7, 2018.

(56) References Cited

U.S. PATENT DOCUMENTS

| | | | |
|---|---|---|---|
| 2017/0154331 A1 | 6/2017 | Voorhees | |
| 2017/0206522 A1 | 7/2017 | Schiatti et al. | |
| 2017/0213209 A1 | 7/2017 | Dillenberger | |
| 2017/0222814 A1 | 8/2017 | Oberhauser et al. | |
| 2017/0228371 A1 | 8/2017 | Seger, II | |
| 2017/0230353 A1* | 8/2017 | Kurian | H04L 63/0815 |
| 2017/0295157 A1* | 10/2017 | Chavez | G06F 21/44 |
| 2017/0331896 A1* | 11/2017 | Holloway | H04L 67/12 |
| 2017/0352027 A1 | 12/2017 | Zhang et al. | |
| 2017/0372300 A1 | 12/2017 | Dunlevy et al. | |
| 2018/0137507 A1 | 5/2018 | Jayachandran et al. | |

FOREIGN PATENT DOCUMENTS

| | | |
|---|---|---|
| CN | 107194587 A | 9/2017 |
| CN | 107301600 A | 10/2017 |
| CN | 107657986 A | 2/2018 |
| JP | 2017224018 A | 12/2017 |
| WO | 2017161417 A1 | 9/2017 |
| WO | 2018089843 A1 | 5/2018 |

OTHER PUBLICATIONS

Pachhai, "Elastos Architecture: The main chain, sidechains and friendchains," Jun. 1, 2018 (Year: 2019).*

Blockstream, "Elements code tutorial," Jul. 24, 2019 (Year: 2019).*

Lauren Mack, 3 ways blockchain technology could revolutionize the law, Mar. 12, 2018, downloaded at: https://technical.ly/brooklyn/2018/03/12/3-ways-blockchain-technology-revolutionize-law/, 2 pages.

Scholl et al., Electronic Government, 15th IFIP WG 8.5 International Conference, EGOV 2016 Guimarães, Portugal, Sep. 5-8, 2016 Proceedings, Springer, 321 pages.

Febin John James, A Beginner's Guide to Blockchain—Hacker Noon, Jan. 1, 2018, downloaded at: https://hackernoon.com/a-beginners-guide-to-blockchain-d04266844e7, 9 pages.

Bernard Marr, A Complete Beginner's Guide to Blockchain, Enterprise & Cloud, Jan. 24, 2017, downloaded at: https://www.forbes.com/sites/bernardmarr/2017/01/24/a-complete-beginners-guide-to-blockchain/#16d82faa6e60, 5 pages.

Wright et al., Decentralized Blockchain Technology and the Rise of Lex Cryptographia, Mar. 20, 2015, downloaded at: http://ssrn.com/abstract=2580664, 58 pages.

Jabbar et al, Growing the Blockchain Information Infrastructure, The Infrastructure of Trust, ACM Digital Library, ACM, CHI 2017, May 6-11, 2017, Denver, CO, USA, downloaded at: http://dx.doi.org/10.1145/3025453.3025959, 2 pages.

Dmytro Brovkin, How to Develop a Blockchain Application—The Startup—Medium, Nov. 8, 2017, downloaded at: https://medium.com/sw1h/how-to-develop-a-blockchain-application-185bf8b7e7eb, 11 pages.

Decker et al., Information Propagation in the Bitcoin Network, 13-th IEEE International Conference on Peer-to-Peer Computing, 2013, downloaded at: ieeexplore.ieee.org/abstract/document/6688704/?reload=true, 10 pages.

Azaria, et al., MedRec: Using Blockchain for Medical Data Access and Permission Management, 2016 2nd International Conference on Open and Big Data, 2016 IEEE, downloaded at: ieeexplore.ieee.org/abstract/document/7573685/, pp. 25-30.

Biswas et al., Securing Smart Cities Using Blockchain Technology, 2016 IEEE 18th International Conference on High Performance Computing and Communications; IEEE 14th International Conference on Smart City; IEEE 2nd International Conference on Data Science and Systems, downloaded at: ieeexplore.ieee.org/abstract/document/7828539/, pp. 1392-1393.

Kavanagh et al., Bitcoin and the Blockchain: A coup d'état in Digital Heterotopia?, Humanistic Management Network Research Paper No. 23/15, Jul. 8, 2015, downloaded at: https://ssrn.com/abstract=2624922, 27 pages.

Trevor I. Kiviat, Beyond Bitcoin: Issues in Regulating Blockchain Transactions, vol. 65: 569, Duke Law Journal, 2015, pp. 570-608.

Elliott et al., What is Blockchain Technology? A Step-by-Step Guide for Beginners, Blockgeeks, Mar. 6, 2018, dwonloaded at: blockgeeks.com/guides/what-is-blockchain-technology/, 50 pages.

Steve Olenski, What the Blockchain Revolution Means for CMOs, Forbes Magazine, Mar. 12, 2018, downloaded at: https://www.forbes.com/sites/steveolenski/2018/03/12/what-the-blockchain-revolution-means-for-cmos/#6807704e6f5d, 5 pages.

International Search Report and Written Opinion for Application No. PCT/US2019/022154, dated May 24, 2019, 11 pages.

Kirkman S S., et al., "Using Smart Contracts and Blockchains to Support Consumer Trust Across Distributed Clouds," The 13th International Conference on Grid, Cloud and Cluster Computing, Worldcomp, GCC, retrieved rom https://csce.ucmss.com/books/LFS/CSREA2017/GCC3688.pdf, Jul. 2017, pp. 10-16.

* cited by examiner

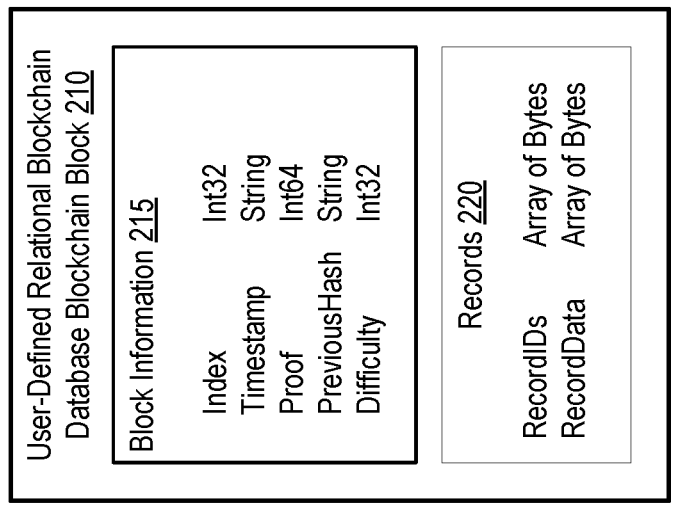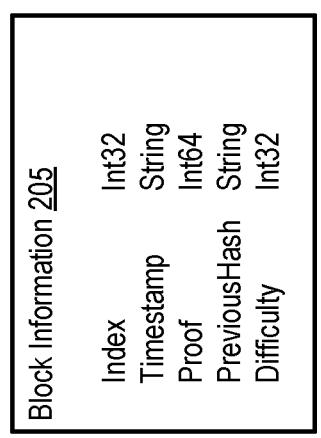
FIG. 2

```
┌─────────────────────────────────────────────────────────┐
│  CREATE A USER RELATIONAL BLOCKCHAIN DATABASE THAT      │
│  INCLUDES A SET OF SYSTEM-DEFINED USER BLOCKCHAINS AND A│
│  PLURALITY OF USER-DEFINED BLOCKCHAINS 610              │
└─────────────────────────────────────────────────────────┘
                            ↓
┌─────────────────────────────────────────────────────────┐
│  RECEIVE A COMMAND TO WRITE DATA TO THE USER RELATIONAL │
│  BLOCKCHAIN DATABASE, THE COMMAND IDENTIFYING A FIRST ONE│
│  OF THE USER-DEFINED BLOCKCHAINS IN WHICH TO WRITE, THE │
│  FIELD IN WHICH TO WRITE, AND A VALUE TO WRITE   615    │
└─────────────────────────────────────────────────────────┘
                            ↓
┌─────────────────────────────────────────────────────────┐
│  GENERATE A NEW BLOCK FOR THE IDENTIFIED USER-DEFINED   │
│  BLOCKCHAIN THAT INCLUDES THE SET VALUE FOR THE FIELD 620│
└─────────────────────────────────────────────────────────┘
                            ↓
┌─────────────────────────────────────────────────────────┐
│  TRANSMIT THE NEW BLOCK TO A DISTRIBUTED NETWORK OF     │
│  BLOCKCHAIN DATABASE SERVERS FOR CONSENSUS TO ADD THE   │
│  NEW BLOCK TO THE IDENTIFIED USER-DEFINED BLOCKCHAIN 625│
└─────────────────────────────────────────────────────────┘
                            ↓
┌─────────────────────────────────────────────────────────┐
│  PERSIST THE NEW BLOCK TO THE IDENTIFIED USER-DEFINED   │
│  BLOCKCHAIN 630                                         │
└─────────────────────────────────────────────────────────┘
                            ↓
┌─────────────────────────────────────────────────────────┐
│  RECEIVE A COMMAND TO READ DATA FROM THE USER RELATIONAL│
│  BLOCKCHAIN DATABASE, THE COMMAND IDENTIFIES THE FIRST  │
│  USER-DEFINED BLOCKCHAIN AND A FIELD IN WHICH TO READ 635│
└─────────────────────────────────────────────────────────┘
                            ↓
┌─────────────────────────────────────────────────────────┐
│  ACCESS A VALUE OF THE IDENTIFIED FIELD OF THE FIRST    │
│  USER-DEFINED BLOCKCHAIN 640                            │
└─────────────────────────────────────────────────────────┘
                            ↓
┌─────────────────────────────────────────────────────────┐
│  RETURN THE ACCESSED VALUE 645                          │
└─────────────────────────────────────────────────────────┘
```

FIG. 6

RELATIONAL BLOCKCHAIN DATABASE

CROSS-REFERENCE TO RELATED APPLICATIONS

This application is a continuation-in-part of application Ser. No. 15/920,423, filed Mar. 13, 2018, and claims the benefit of U.S. Provisional Application No. 62/715,739, filed Aug. 7, 2018, which are each hereby incorporated by reference.

FIELD

Embodiments of the invention relate to the field of data storage using blockchains; and more specifically, to relational blockchain database.

BACKGROUND

A blockchain is a chain of blocks used to store data that is immutable. Each block in the blockchain can be traced back to a previous block in the chain using the hash of the previous block and the data stored in the current block. Once recorded, the data in any given block cannot be altered retroactively without alteration of all subsequent blocks. Typical blockchains are used to record transactions of cryptocurrencies and smart contracts. These implementations of blockchain technology are stand-alone, independent solutions for their own blockchain. They do not reference foreign blockchains nor do they provide the capacity to do so. They utilize mathematical hashes of their data and a community consensus of blockchain miners to prove authenticity of their data and maintain immutability. They do not share mathematical hashes nor provide for foreign blockchain hashes to be cross-referenced or included in their blockchains, nor do they allow for their miners to provide outside consensus for other blockchains or vice versa.

SUMMARY

A user relational blockchain database is created at a relational blockchain database server. The user relational blockchain database includes a set of one or more system-defined user blockchains and user-defined blockchains. The set of system-defined user blockchains includes metadata for managing the user-defined blockchains. Each user-defined blockchain includes a set of fields as defined by a user, and at least one of the set of fields relates among the user-defined blockchains. The relational blockchain database server receives a command to write data to the user relational blockchain database. The command includes an identification of a first one of the user-defined blockchains, an identification of at least one of the fields of the first user-defined blockchain, and a value to write for the at least one of the fields. The relational blockchain database server generates a new block for the first user-defined blockchain. The new block includes the value set for the at least one field. The relational blockchain database server transmits the new block to a distributed network of blockchain database servers for consensus to add the new block to the first user-defined blockchain. The relational blockchain database server persists the new block to the first user-defined blockchain (e.g., after consensus is reached). The relational blockchain database server receives a command to read data from the user relational blockchain database. This command includes an identification of the first user-defined blockchain and an identification of at least field of the first user-defined blockchain. The relational blockchain database server accesses a value of the identified field and returns the accessed value.

BRIEF DESCRIPTION OF THE DRAWINGS

The invention may best be understood by referring to the following description and accompanying drawings that are used to illustrate embodiments of the invention. In the drawings:

FIG. 2 illustrates the components of a blockchain block and a user-defined database blockchain block, according to an embodiment;

FIG. 6 is a flow diagram that illustrates exemplary operations for a relational blockchain database according to an embodiment.

DESCRIPTION OF EMBODIMENTS

A relational blockchain database and management of the relational blockchain database is described. The relational blockchain database system may include a system relational blockchain database and one or more user relational blockchain databases. The system relational blockchain database includes one or more blockchains that contain metadata for managing the user relational blockchain databases, user logins, mapping logins to database permissions, and managing a distributed P2P network servers and mining options. The user relational blockchain database includes one or more system-defined user blockchains and one or more user-defined blockchains. The system-defined user blockchains include metadata for managing the user-defined blockchains and user permission in that user relational blockchain database.

The relational blockchains can be related allowing for a scalable relational blockchain database management system. For instance, a command to read data can utilize relationships between the blockchains to build results. This allows data to be selected from more than one blockchain even if they are in different relational blockchain databases and/or belong to different users. The data can be read using inner joins, outer joins, and cartesian joins to build result sets. Since blockchains are used for the relational blockchain database, the data is immutable. Further, in an embodiment, the user can structure their datasets in a regular way that allows for transaction efficiencies are similar to more traditional SQL and/or NoSQL database systems.

Figure 1:
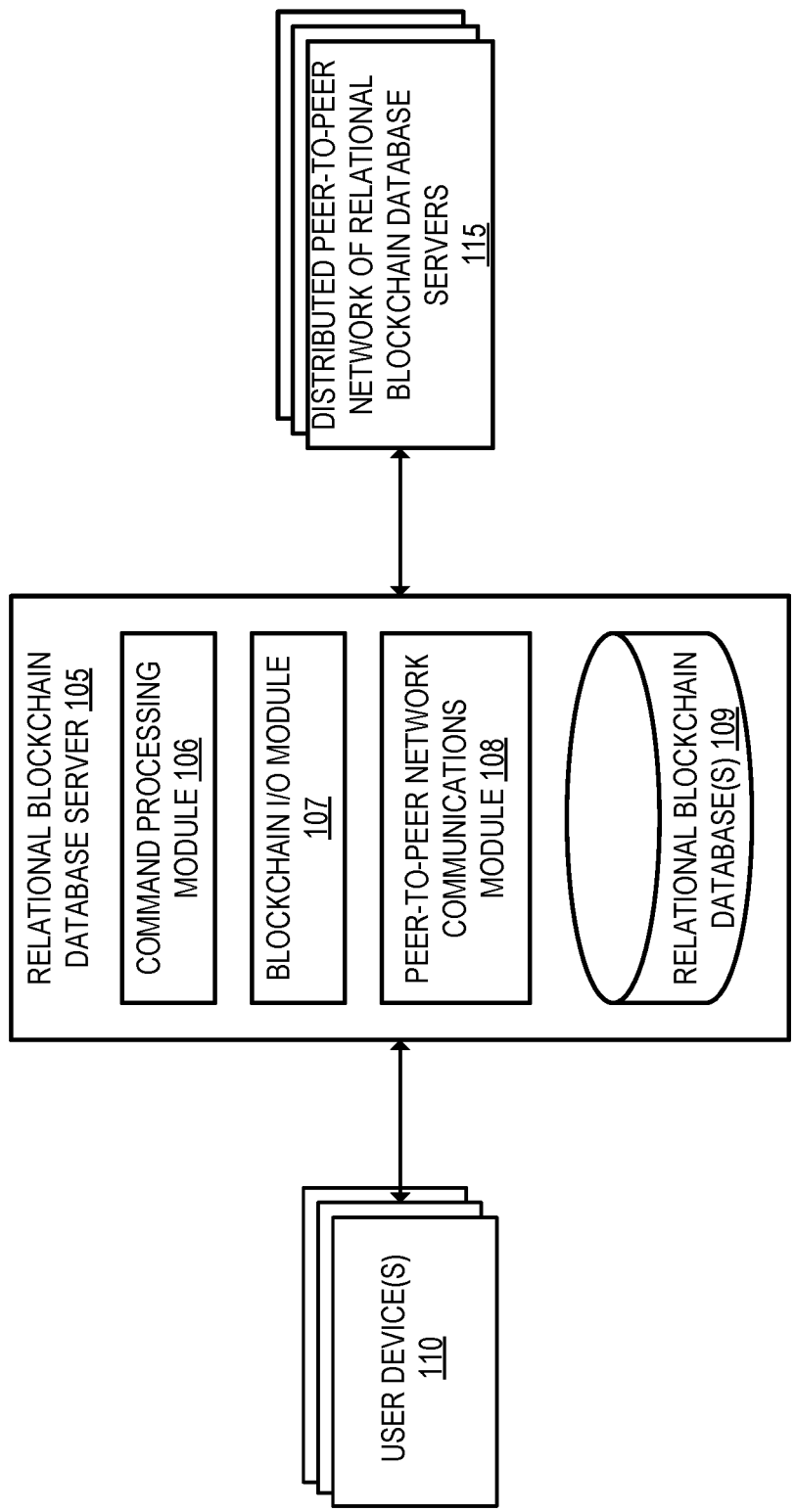
FIG. 1 illustrates an exemplary system according to some embodiments described herein.

FIG. 1 illustrates an exemplary system according to some embodiments described herein. The system illustrated in FIG. 1 includes relational blockchain database server 105, one or more user devices 110, and distributed peer-to-peer network of relational blockchain database servers 115.

User devices 110 are computing devices (e.g., laptops, workstations, smartphones, palm tops, mobile phones, tablets, gaming systems, set top boxes, wearable devices, electronic devices, etc.) that are capable of transmitting and/or receiving network traffic. In one embodiment, each of user devices 110 executes an application that is capable of transmitting commands to and/or receiving responses to relational blockchain database server 105. For example, the application may interact with relational blockchain database server 105 via a GUI or API.

Relational blockchain database server 105 includes command processing module 106, blockchain I/O module 107, peer-to-peer network communications module 108, and relational blockchain database(s) 109. Relational blockchain database server 105 is part of the distributed peer-to-peer network of relational blockchain database servers 115. This provides fault tolerance should any of the relational blockchain database servers fail for any reason.

In one embodiment, relational blockchain database(s) 109 are structured as a collection of individual blockchains. For example, relational blockchain database(s) 109 may include a system relational blockchain database and one or more user-defined relational blockchain databases, where the system relational blockchain database and the one or more user-defined relational blockchain databases are structured as a plurality of blockchains.

In one embodiment, each blockchain is arranged in a linked list data struct of blocks (e.g., a chain), where each block in the chain contains: 1) general block information, including a proof, a previous hash for a previous block in the blockchain, and a difficulty (as further described in FIG. 2); 2) a collection of data fields which are configurable based on the type of data to be stored in each particular blockchain; and 3) a unique identifying property (e.g., a hash) derived from a mathematical hash algorithm applied to the combination of that block's collection of data fields and the hash of the previous block in the chain. In one embodiment, the hash is generated using the hash from the previous block in the chain, the data in the current block, and an incremented proof token, where the hash is generated to satisfy the block's defined difficulty. In one embodiment, each blockchain is initiated with a system-generated block, or genesis block, which includes a starting hash.

In one embodiment, the system writes blockchains to encrypted binary files and places the encrypted binary files in folders for each relational blockchain database. In one embodiment, a database folder contains a single file for each blockchain that has been created in that database as well as a file for each system blockchains that relational blockchain database server 105 created in that database to manage the user's blockchains in that database. As will be described in detail below, system blockchains contain metadata about user blockchains, their fields, data types, sizes, and other settings. In one embodiment, for a new block to be added to the chain for a given blockchain, a majority of independently running software processes (e.g., miners) on distributed peer-to-peer network of relational blockchain database servers 115 vote and agree to the validity of the block's hash.

In one embodiment, command processing module 106 is configured to receive commands from user device 110. In one embodiment, command processing module 106 receives the commands from one or more user device(s) 110 via an application programming interface (API). The commands allow a user of user device 110 to initiate various operations with respect to a relational blockchain database, including creating a relational blockchain database, creating a blockchain, inserting a blockchain record, and selecting data from one or more blockchains. In one embodiment, command processing module 106 is further configured to parse a received command and build a database description object consisting of the relational blockchain database name and the information of the user that sent the command (e.g., a login identifier).

In one embodiment, blockchain I/O module 107 is configured to process read and write operations on blockchains in relational blockchain database(s) 109 in response to commands received by command processing module 106. In one embodiment, blockchain I/O module 107 performs low-level blockchain operations of creating a new blockchain, persisting to memory and storage, adding new blocks to a blockchain, mining new blocks, and retrieving block information from a blockchain. Blockchain I/O module 107 can also unload a blockchain from memory (e.g., detaching) and close open file handles to it to allow the persisted blockchain file to be copied or moved. Blockchain I/O module 107 can also load a blockchain from a file to memory (e.g., attaching). Blockchain I/O module 107 can also save a copy of the blockchain (e.g., a backup) to a file without blocking access to the blockchain or detaching and reattaching the blockchain.

For example, for a command involving a write to a relational blockchain database, blockchain I/O module 107 accesses the relational blockchain database where data is to be written, converts the data into a format for storage (e.g., bytes), queues the formatted data for commitment to a block in the relational blockchain database, and places the data into a temporary hash store while waiting to mine the block.

In one embodiment, blockchain I/O module 107 is configured to relate and enforce relationships of data at the block level between relational blockchains, e.g., the ability of client applications to insert data in blocks in one blockchain which reference data in blocks of another blockchain or of blocks in the same blockchain. In one embodiment, to relate data from one block to another, blockchain I/O module 107 first validates that the value being inserted in the referencing block (e.g., the foreign key value) exists in the referenced block of the referenced blockchain (e.g., the primary key value). In one embodiment, the primary key value is a UUID. This process creates referential integrity between the two blocks. Additionally, since blockchains are immutable, these relationships are also immutable.

In one embodiment, peer-to-peer network communications module 108 is configured to facilitate blockchain data synchronization across disparate servers (e.g., distributed peer-to-peer network of relational blockchain database servers 115). In one embodiment, peer-to-peer network communications module 108 is configured with consensus voting protocols that provide a mechanism to allow blockchain block data to be validated across one or more relational blockchain database servers before being written to a blockchain. In one embodiment, peer-to-peer network communications module 108 is configured with mining protocols that provide a mechanism to mine unmined blockchain blocks. In one embodiment, peer-to-peer network communications module 108 is configured with syncing protocols that provide a mechanism to synchronize a peer server. In one embodiment, peer-to-peer network communications module 108 is configured with sharing protocols that provide a mechanism to distribute and decentralize computations.

For example, after a new block to be added to the chain has been validated (as described above), peer-to-peer network communications module 108 sends the new block to each peer in distributed peer-to-peer network of relational blockchain database servers 115 to be written to identical blockchain files in identically arranged database folders. In such embodiments, because the relational blockchain databases, folders, and files exist on all servers in the distributed peer-to-peer network and their data is guaranteed to be synchronized, an application can read and write data to and from any of the servers and expect the same results. As a result of distributed peer-to-peer network of relational blockchain database servers 115 maintaining consistent blockchain information client applications are able to scale performance of storing and retrieving blocks on the blockchain by load balancing their requests across out distributed peer-to-peer network of relational blockchain database servers 115.

In one embodiment, each peer server of distributed peer-to-peer network of relational blockchain database servers 115 manages blockchains at a low-level as mentioned above (e.g., via blockchain I/O module 107) but additionally all peers are in constant communication via peer-to-peer network protocols to maintain data consistency across all servers in distributed peer-to-peer network of relational blockchain database servers 115. As a new block is added to a blockchain on one server (e.g., relational blockchain database server 105) the process of mining that new block triggers a multiple phase commit across all peer servers (e.g., distributed peer-to-peer network of relational blockchain database servers 115). Once enough peers validate the new block (e.g., consensus is reached), all peers are notified to permanently write the block to their copy of the blockchain.

FIG. 2 illustrates the components of a blockchain block and a user-defined relational blockchain database blockchain block, according to an embodiment. In one embodiment, block information 205 depicts the plurality of data fields each blockchain block includes, where each data field has an associated data field type. Each block of each relational blockchain described herein may include the information illustrated in block information 205. In the example in FIG. 2, block information 205 includes an Index (Int32), a Timestamp (String), a Proof (Int64), a PreviousHash value (String), and a Difficulty (Int32). Other examples can include additional, fewer, or different information. The data fields store information expressing that blocks relevance to other blocks in the blockchain.

User-defined relational blockchain database blockchain block 210 is an example template for each blockchain block that will be created in a user-defined relational blockchain database. In one embodiment, user-defined relational blockchain database blockchain block 210 includes block information 215 and records container 220. Block information 215 can include the same components depicted in block information 205. In one embodiment, records container 220 includes an array of records storing RecordIDs and RecordData. In one embodiment, both RecordIDs and RecordData are arrays of bytes. In one embodiment, using an array of bytes data type for RecordIDs and RecordData allows for greater flexibility in the types of data that can be stored because all data can be converted down to bytes.

Figure 3:
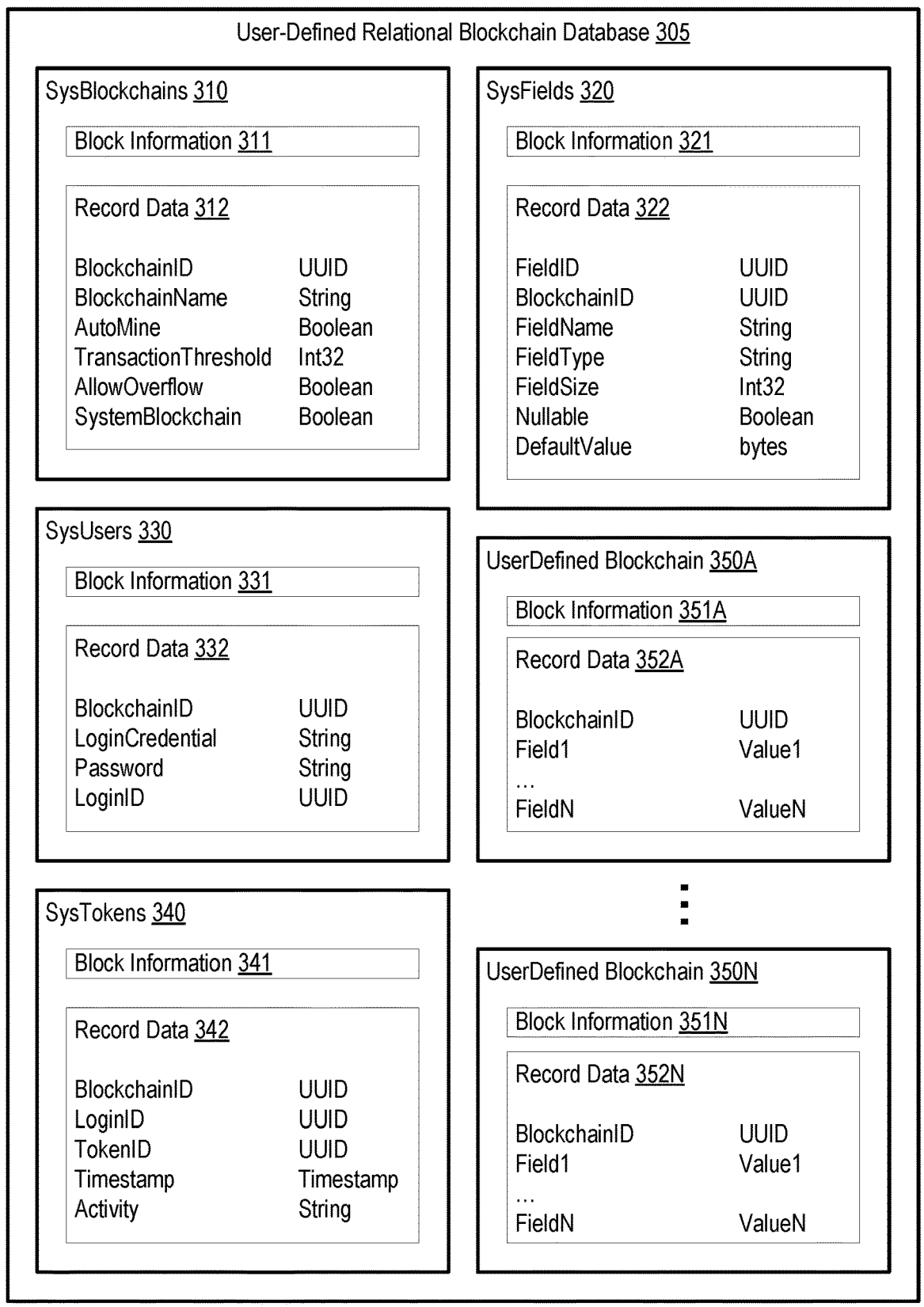
FIG. 3 illustrates a user-defined database for storing one or more blockchains, according to an embodiment.

FIG. 3 illustrates a user-defined relational blockchain database for storing one or more blockchains, according to an embodiment. When a user defines a relational blockchain database (e.g., via a CREATE DATABASE command), User-Defined Relational Blockchain Database 305 is generated. In one embodiment, User-Defined Relational Blockchain Database 305 is generated to include default system-defined user blockchains (e.g., SysBlockchains blockchain 310, SysFields blockchain 320, SysUsers blockchain 330, and SysTokens blockchain 340) and one or more user-defined blockchains 350A-N. Each of the blockchains 310, 320, 330, 340, and 350A-N include block information 311, 321, 331, 341, and 351A-N, respectively. The block information for each specific blockchain stores the Index, Timestamp, Proof, PreviousHash, and Difficulty associated with the specific blockchain. For example, a new hash value is generated for a block to be mined to the blockchain based on the hash value stored in PreviousHash and the data in the block to be mined. The new hash value is subsequently stored as the new value in PreviousHash.

SysBlockchains blockchain 310 is a system-defined user blockchain that stores information regarding all the blockchains in a given user-defined relational blockchain database. Record Data 312 for SysBlockchains blockchain 310 includes one or more of a BlockchainID (UUID), BlockchainName (String), AutoMine (Boolean), TransactionThreshold (Int32), and AllowOverflow (Boolean). Each blockchain is associated with a BlockchainID and a BlockchainName. In one embodiment, BlockchainID is automatically generated by the system. AutoMine indicates whether to have automatic or manual mining, TransactionThreshold indicates a number of records to store in a block before automatic mining, and AllowOverflow indicates whether a block can include more than the number of records defined by TransactionThreshold. For example, for a messages blockchain, the user can define TransactionThreshold to be 1000 records (e.g., messages) for each block. Further, if 1010 message records created simultaneously or within a short period of time, the block can include all 1010 records, exceeding the TransactionThreshold value.

SysFields blockchain 320 is a system-defined user blockchain that stores information regarding fields in the blocks of the specific blockchains in a given user-defined relational blockchain database, including user-defined fields based on the type of data a user is intending to store in the blocks. Record Data 322 for SysFields blockchain 320 includes one or more of a FieldID (UUID), BlockchainID (UUID), FieldName (String), FieldType (String), FieldSize (Int32), Nullable (Boolean), and DefaultValue (bytes). The FieldID identifies the location of the field in the array of bytes. The BlockchainID identifies the user's blockchain in which the field will be used. FieldName, FieldType, and FieldSize identify the name of the field, the type of field, and the size of the field (e.g., in bytes), respectively. Nullable indicates whether the field is a required field. For example, if a field is not nullable (i.e., is a required field), and the field is not included when a record is created, an error message or indicator is presented. DefaultValue is a default value for the field that can be used when the field is not nullable. In some embodiments, DefaultValue can be a static value or a first-level function. For example, the system can use the first-level function can be used to generate a FieldID for the field.

In one embodiment, blockchain I/O module 107 references system-defined user blockchains (e.g., SysBlockchains blockchain and SysFields blockchain) while managing user-defined blockchains.

SysUsers blockchain 330 is a system-defined user blockchain that stores user registration information. For example, if an application requires users to login to the application using a user account, SysUsers blockchain 330 provides a structure to store user account information. Record Data 332 for SysUsers blockchain 330 includes one or more of a BlockchainID (UUID), a LoginCredential (String), a Password (String), and LoginID (UUID). In another embodiment, SysUsers blockchain 330 includes additional information as defined by an administrator of a user-defined relational blockchain database. Additional user account information can include Email (String), FirstName (String), LastName (String), PhoneNumber (Int32).

SysTokens blockchain 340 is a system-defined user blockchain that stores token information corresponding to user activities with a system or application. When a user logs in to a system, a short-term token is generated. SysTokens blockchain 340 provides a structure to store token information. Record Data 342 for SysTokens blockchain 340 includes one or more of a BlockchainID (UUID), a LoginID (UUID), TokenID (UUID), Timestamp (Timestamp), and Activity (String). Timestamp stores the time the token was issued and can be used to determine whether a token needs to be refreshed or can be released. Activity stores metadata regarding a user's interactions with the system (e.g., time of login, day of login, modification made to user's account, accounts/profiles viewed, posts viewed, frequency of views to specific accounts or posts, messages sent and to which accounts, etc.).

UserDefined Blockchains 350A-N are each a user-defined blockchain that stores data for the user. The user defines and may control the data to be stored. The data is stored in blocks, where the type of data stored in each of UserDefined Blockchain 350A-N is based on the field assigned to that relational blockchain database. For example, Record Data 352A for UserDefined Blockchain 350A indicates that data associated with Field1-FieldN, with corresponding values Value1-ValueN, are stored in UserDefined Blockchain 350A. Similarly, Record Data 352N for UserDefined Blockchain 350N indicates that data associated with Field1-FieldN, with corresponding values Value1-ValueN are stored in UserDefined Blockchain 350N. Record Data 352A-N further include BlockchainID (UUID) indicating the blockchain identifier of the corresponding UserDefined Blockchain 350A-N.

In an alternative embodiment, the metadata for managing the user-defined blockchains in and user permissions for a user relational blockchain database is stored in another file or data structure type (e.g., flat files, tables, binaries, cvc, etc.).

Figure 4:
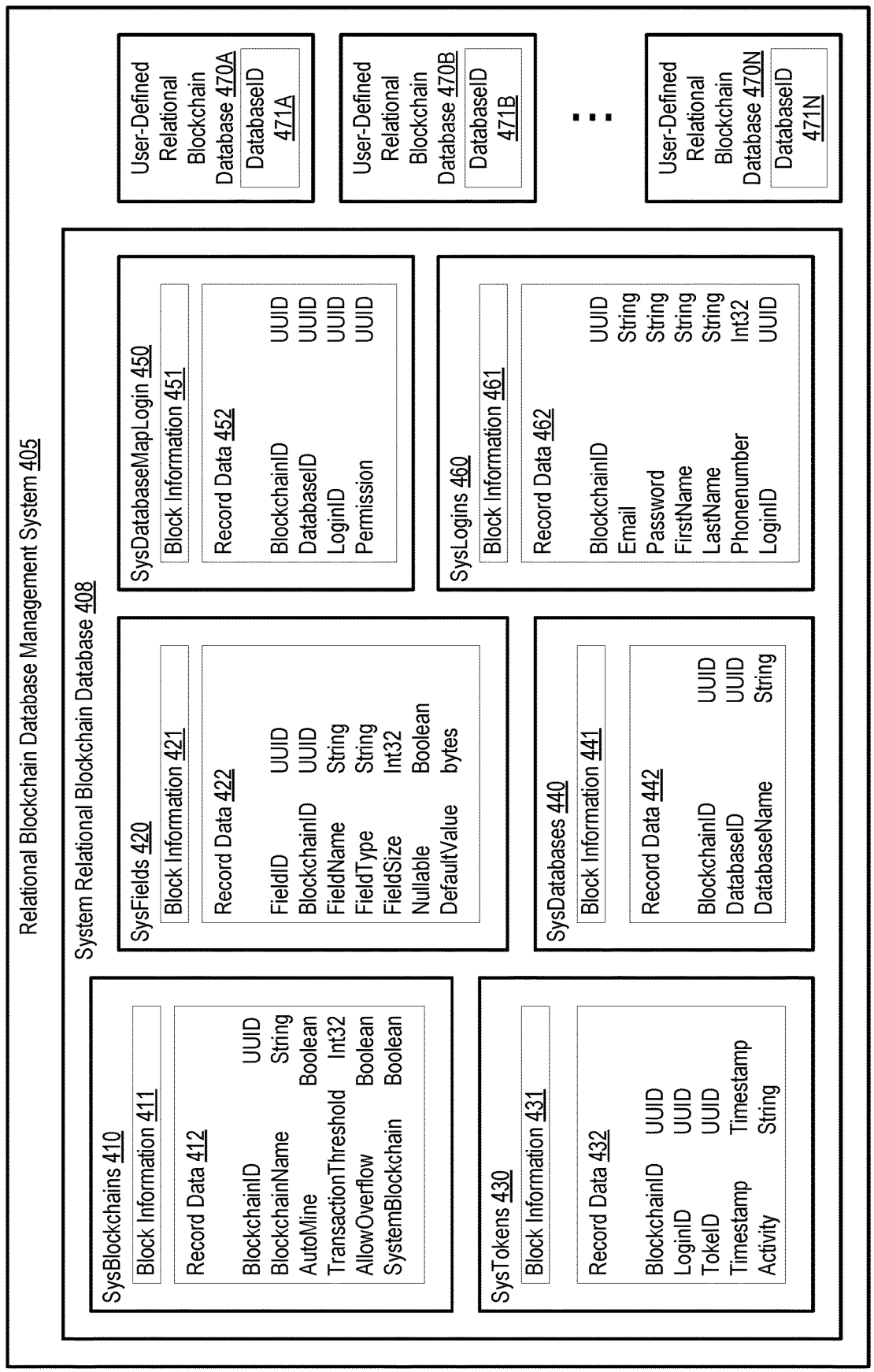
FIG. 4 illustrates a database management system for managing user-defined relational blockchain databases for storing one or more blockchains, according to an embodiment.

FIG. 4 illustrates a relational blockchain database management system for managing user-defined relational blockchain databases for storing one or more blockchains, according to an embodiment. Relational Blockchain Database Management System 405 includes System Relational Blockchain Database 408 and one or more User-Defined Relational Blockchain Databases 470A-N. In one embodiment, System Relational Blockchain Database 408 is a collection of system relational blockchains containing metadata for managing user relational blockchain databases, user logins, and mapping logins to user database permissions as well as managing the distributed P2P network servers and mining options. In one embodiment, System Relational Blockchain Database 408 provides the ability to create and name new user-defined relational blockchain databases and choose where to store them. System Relational Blockchain Database 408 also provides the ability to manage client application logins and access privileges to user blockchain databases.

In one embodiment, System Relational Blockchain Database 408 includes default system relational blockchains (e.g., SysBlockchains blockchain 410, SysFields blockchain 420, SysTokens blockchain 430, and SysDatabases blockchain 440, SysDatabaseMapLogin blockchain 450, and SysLogins blockchain 460). Each of the blockchains 410, 420, 430, 440, 450, and 460 include block information 411, 421, 431, 441, 451, and 461, respectively. The block information for each specific blockchain stores the Index, Timestamp, Proof, PreviousHash, and Difficulty associated with the specific blockchain.

SysBlockchains blockchain 410 is a system blockchains blockchain that stores information regarding all the blockchains in the system relational blockchain database 408. Record Data 412 for SysBlockchains blockchain 410 includes one or more of a BlockchainID (UUID), BlockchainName (String), AutoMine (Boolean), TransactionThreshold (Int32), and AllowOverflow (Boolean). Each blockchain is associated with a BlockchainID and a BlockchainName. In one embodiment, BlockchainID is automatically generated by the system. AutoMine indicates whether to have automatic or manual mining, TransactionThreshold indicates a number of records to store in a block before automatic mining, and AllowOverflow indicates whether a block can include more than the number of records defined by TransactionThreshold. For example, for a messages blockchain, the user can define TransactionThreshold to be 1000 records (e.g., messages) for each block. Further, if 1010 message records created simultaneously or within a short period of time, the block can include all 1010 records, exceeding the TransactionThreshold value.

SysFields blockchain 420 is a system fields blockchain that stores information about the fields of the blocks of the blockchains in the system relational blockchain database 408. The SysFields blockchain 420 may be hard coded to describe the fields of the system blockchains. Record Data 422 for SysFields blockchain 420 includes one or more of a FieldID (UUID), BlockchainID (UUID), FieldName (String), FieldType (String), FieldSize (Int32), Nullable (Boolean), and DefaultValue (bytes). The FieldID identifies the location of the field in the array of bytes. The BlockchainID identifies the blockchain in which the field will be used. FieldName, FieldType, and FieldSize identify the name of the field, the type of field, and the size of the field (e.g., in bytes), respectively. Nullable indicates whether the field is a required field. For example, if a field is not nullable (i.e., is a required field), and the field is not included when a record is created, an error message or indicator is presented. DefaultValue is a default value for the field that can be used when the field is not nullable. In some embodiments, DefaultValue can be a static value or a first-level function. For example, the system can use the first-level function can be used to generate a FieldID for the field.

SysTokens blockchain 430 is a system tokens blockchain that stores information about administrator activities with the system. When an administrative user logs in to a system, a short-term token is generated. SysTokens blockchain 430 provides a structure to store token information. Record Data 432 for SysTokens blockchain 430 includes one or more of a BlockchainID (UUID), a LoginID (UUID), TokenID (UUID), Timestamp (Timestamp), and Activity (String). Timestamp stores the time the token was issued and can be used to determine whether a token needs to be refreshed or can be released. Activity stores metadata regarding an administrative user's interactions with the system (e.g., time of login, day of login, modification made to admin's account, accounts/profiles viewed, posts viewed, frequency of views to specific accounts or posts, messages sent and to which accounts, etc.).

SysLogins blockchain 460 is a system logins blockchain that stores information about administrative users that perform a login operation to Relational Blockchain Database Management System 405. For example, when an administrator logs into Relational Blockchain Database Management System 405, SysLogins blockchain 460 provides a structure to store information about a user account associated with the logged in user in a new block in SysLogins blockchain 460. In one embodiment, Record Data 462 for SysLogins blockchain 460 includes one or more of a BlockchainID (UUID), an Email (String), a Password (String), FirstName (String), LastName (String), PhoneNumber (Int32), and LoginID (UUID). In another embodiment, Record Data 462 for SysLogins blockchain 460 includes the same fields as SysUsers 330 (as depicted in FIG. 3).

SysDatabases blockchain 440 is a system databases blockchain that stores identification information for generated user-defined relational blockchain databases. Record Data 442 for SysDatabases blockchain 440 includes a BlockchainID (UUID), a DatabaseID (UUID), and a DatabaseName (String). In one embodiment, when a user defines a database (e.g., via a CREATE DATABASE command), the user can provide a name for the database that and Relational Blockchain Database Management System 405 stores in DatabaseName. In addition, Relational Blockchain Database Management System 405 can generate a unique identifier for the database and stores the unique identifier in DatabaseID. The information for the newly created database is then stored as a new block in SysDatabases blockchain 440.

SysDatabaseMapLogin blockchain 450 is a system blockchain that stores the association between blockchain databases and users. Record Data 452 for SysDatabaseMap Login 450 includes a BlockchainID (UUID), a DatabaseID (UUID), a LoginID (UUID), and a Permission (UUID). For example, SysDatabaseMapLogin blockchain 450 stores the login identifiers and the permissions for each user associated with a specific User-Defined Relational Blockchain Database. In one embodiment, the Permission value is an identifier used to identify a location in a Permissions data structure (e.g., a blockchain) storing permission data for users.

In one embodiment, User-Defined Relational Blockchain Databases 470A-N are examples of User-Defined Relational Blockchain Database 305 (in FIG. 3), and each of User-Defined Relational Blockchain Databases 470A-N is associated with a DatabaseID 471A-N (corresponding to the DatabaseIDs stored in SysDatabases blockchain 440) that uniquely identifies a specific User-Defined Relational Blockchain Database.

In one embodiment, System Relational Blockchain Database 408 also includes SysP2P blockchain, SysMapDatabaseP2P blockchain, and SysMapConsensusP2P blockchain. In one embodiment, System Relational Blockchain Database 408 provides the ability to manage distributed peer-to-peer network of relational blockchain database servers 115 through the SysP2P blockchain and map user blockchain databases across one or more distributed peer-to-peer network of relational blockchain database servers 115 with the SysMapDatabaseP2P blockchain. System Relational Blockchain Database 408 also provides the ability to manage mining consensus with pools of distributed peer-to-peer network of relational blockchain database servers 115 with the SysMapConsensusP2P.

In an alternative embodiment, the metadata for managing the user relational blockchain databases, user logins, mapping logins to database permissions, and managing a distributed P2P network servers and mining options for the system relational blockchain database is stored in another file or data structure type (e.g., flat files, tables, binaries, cvc, etc.).

Figure 5:
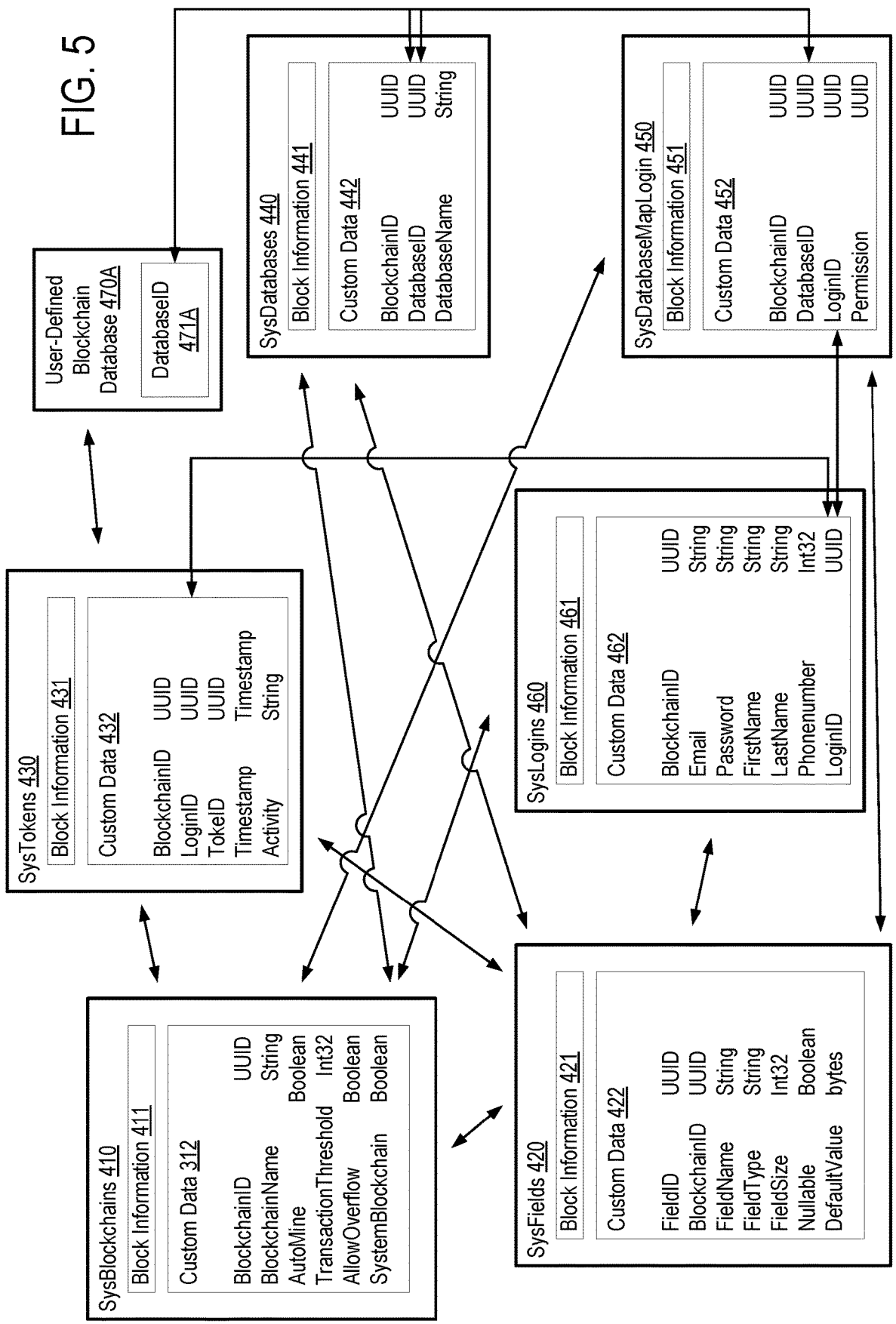
FIG. 5 illustrates the relationships between the blockchains in a database management system, according to an embodiment.

FIG. 5 illustrates the relationships between the blockchains in a database management system, according to an embodiment. In one embodiment, SysBlockchains blockchain 410 and SysFields blockchain 420 are system-defined blockchains. In one embodiment, each of the blockchains, SysTokens blockchain 430, SysDatabases blockchain 440, SysDatabaseMapLogin blockchain 450, and SysLogins blockchain 460 are defined by the SysBlockchains blockchain 410 and SysFields blockchain 420.

In one embodiment, in response to a command to create a new database, SysDatabases blockchain 440 stores a DatabaseID and DatabaseName for the new user-defined relational blockchain database (e.g., 470A). User-defined relational blockchain database 470A also stores the DatabaseID (e.g., 471A). In one embodiment, when a user logs into Relational Blockchain Database Management System 405 (e.g., using a login identifier), the login event is stored in a block in SysLogins blockchain 460. Relational Blockchain Database Management System 405 can further link or relate the block in SysLogins blockchain 460 to a block in SysDatabaseMapLogin blockchain 450 indicating the login event by the user, and SysDatabaseMapLogin blockchain 450 can relate the login event with the specific database being logged into with SysDatabases blockchain 440 using the DatabaseID.

In one embodiment, when Relational Blockchain Database Management System 405 receives a command from the user related to user-defined relational blockchain database 470A, the command will include identifying information for the database (e.g., the database name) that Relational Blockchain Database Management System 405 can associate with the appropriate DatabaseID in SysDatabases blockchain 440. Relational Blockchain Database Management System 405 can then perform the requested command on user-defined relational blockchain database 470A.

FIG. 6 is a flow diagram that illustrates exemplary operations for a relational blockchain database according to an embodiment. The operations of FIG. 6, and the other flow diagrams, will be described with reference to the exemplary embodiment of the other figures. However, it should be understood that the operations of FIG. 6, and the other flow diagrams, can be performed by embodiments of the invention other than those discussed with reference to the other figures, and the embodiments discussed with reference to the other figures can perform operations different than those discussed with reference to FIG. 6 and the other flow diagrams. The operations of FIG. 6 are described as being performed by the relational blockchain database server 105.

At operation 610, the relational blockchain database server 105 creates a user relational blockchain database that includes a set of one or more system-defined user blockchains and multiple user-defined blockchains. The set of one or more system-defined user blockchains includes metadata for managing the multiple user-defined blockchains. Each of the user-defined blockchains includes a set of one or more fields as defined by a user, and wherein at least one of the set of one or more fields relates among the user-defined blockchains. The user relational blockchain database may be created like that as described in FIG. 7 described later herein.

Although not illustrated in FIG. 6, the relational blockchain database server 105 may create a system relational blockchain database that includes one or more management blockchains (system-defined system blockchains) that include metadata for managing the user-defined blockchains. The management blockchain(s) may also manage user permissions, user logins, and/or manage the distributed P2P network servers and mining options. The management blockchain(s) may include field(s) defined by a system administrator and at least some of the fields may relate among the management blockchain(s) and/or the user-defined blockchains.

Next, at operation 615, the relational blockchain database server 105 receives a command to write data to the user relational blockchain database. The command includes an identification of a first one of user-defined blockchains, an identification of at least one of the set of fields of the first user-defined blockchain, and a value to write. The command may be an INSERT command as described later herein, and the command may be processed like that as described in FIGS. 9 and 10 described later herein.

Next, at operation 620, the relational blockchain database server 105 generates a new block for the identified first user-defined blockchain. The generated new block includes the value set for the identified field(s) of the first user-defined blockchain. The new block may be similar to the block 210 previously described.

Next, at operation 625, the relational blockchain database server 105 transmits the new block a distributed network of blockchain database servers for consensus to add the new block to the identified first user-defined blockchains. In an embodiment, each blockchain can be set to be automatically mined or manually mined. With automatic mining, the relational blockchain database server 105 determines when the new block is transmitted to the distributed network of blockchain database servers for consensus. The relational blockchain database server 105 may batch blocks together to conserve bandwidth and resources. A limit can be defined for the number of data records that can be added to each individual block before the block is transmitted to the distributed network of blockchain database servers for consensus. Until that limit is reached (or until a predefined amount of time has elapsed), further records can be added to the block. If the limit is reached (or if the predetermined amount of time has elapsed), the block may be transmitted to the distributed network of blockchain database servers for consensus. With manual mining, the block is not transmitted to the distributed network of blockchain database servers for consensus until a command to mine is received (as discussed later herein).

Next, at operation 630, the relational blockchain database server 105 persists the new block to the identified user-defined blockchain. In an embodiment, the relational blockchain database server 105 does not persist the new block to the identified user-defined blockchain until consensus is reached among the distributed network of blockchain database servers. In an embodiment, the operations of 620-630 are performed in a like way as described with respect to FIGS. 9 and 10 described later herein.

Sometime later, at operation 635, the relational blockchain database server 105 receives a command to read data from the user relational blockchain database. The command includes an identification of the first user-defined blockchain and an identification of at least one field of the first user-defined blockchain. The command may be a SELECT command as described later herein, and the command may be processed like that as described in FIGS. 11, 12, and 13 described later herein.

Next, at operation 640, the relational blockchain database server 105 accesses a value of the identified field(s) of the first o user-defined blockchains, and at operation 645, the relational blockchain database server 105 returns the accessed value.

Although FIG. 6 provides an example of reading data from one blockchain, data may be read from multiple blockchains. For instance, a command to read data may include a clause (e.g., a JOIN clause) that specifies one or more blockchains and field values to relate to other blockchains. For instance, a field from the first user-defined blockchain can relate to a field from a second user-defined blockchain. In an embodiment, the relational blockchain database server 105 performs the join by comparing the selected element from the first user-defined blockchain to each selected element of a second user-defined blockchain based on the join conditional.

I. Example Blockchain Commands

In one embodiment, the following blockchain structured query language (bSQL) commands can be used to perform various query and administration operations, including creating a relational blockchain database, creating a blockchain, inserting a blockchain record into a relational blockchain database, and selecting data from one or more blockchains. Additional commands include register login, create login, grant logins access to relational blockchain databases, backup a relational blockchain database, export a blockchain, import a blockchain, select P2P servers, add and remove P2P servers. In one embodiment, because mined blocks are distributed throughout distributed peer-to-peer network of relational blockchain database servers 115, any bSQL command (other than the MINE command) can be sent to any bSQL Server in distributed peer-to-peer network of relational blockchain database servers 115 to achieve the same expected results. In contrast, the MINE command is server-specific and triggers mining activities on unmined blocks for a specific blockchain on that server only.

The CREATE DATABASE command creates a new relational blockchain database container. In the example below, the CREATE DATABASE command takes in a database name parameter and initializes a new relational blockchain database with the provided database name parameter.

CREATE DATABASE <DatabaseName>

In one embodiment, the system receives a bSQL CREATE DATABASE command from a user to create a new relational blockchain database (e.g., User-Defined Relational Blockchain Database 305). The system parses the command and builds a database description object which consists of the database name and the information of the user that sent the command. The system generates a universally unique identifier (UUID) for the relational blockchain database. The system then inserts a record into SysDatabaseMapLogin (e.g., 450), where the record maps the requesting user's login identifier to the generated UUID for the database, as LoginID and DatabaseID objects, respectively. The system then inserts a record into SysDatabases blockchain (e.g., 440) with the generated UUID stored as a DatabaseID object, and the requested database name from the CREATE DATABASE command stored as a DatabaseName object. The system initializes the new user relational blockchain database with new system blockchains: SysBlockchains (e.g., 310), SysFields (e.g., 320), SysUsers (330), and SysTokens (e.g., 340), by inserting parameters for the system blockchains. Each new system blockchain is generated with a genesis block (e.g., an empty container containing a default proof and the record data for the system blockchain). Unlike subsequent blocks in the system blockchains, the genesis block does not reference a previous block.

The CREATE BLOCKCHAIN command creates a new blockchain inside an existing database container. In the example below, the CREATE BLOCKCHAIN command takes in a relational blockchain database name and blockchain name parameter, and blockchain specific parameters (e.g., automine, transactionthreshold, allowoverflow, etc.) in addition to one or more fields. For each field, field-specific properties can be provided, including a field name, a field data type (e.g., int, string, universally unique identifier (UUID), Boolean, bytes, etc.), default, nullable, and other field specific parameters. Each new user-defined blockchain is generated with a genesis block (e.g., an empty container containing a default proof and the record data for the blockchain).

CREATE BLOCKCHAIN <DatabaseName>.
      <BlockchainName>[automine][transactionthreshold
      (Number of records)][allowoverflow][blockchain
      Parameters . . . ]( . . . )
      (<FieldName1><FieldType>[(<FieldSize>)][default
      (<defaultValue>)][nullable][Field Specific
      Properties . . . ],
    . . .
      <FieldNameN><FieldType>[(<FieldSize>)][default(<defaultValue>)][nullable][Field Specific Properties . . . ])

The SELECT command retrieves data from one or more blockchains specified in the command. Selecting from a single blockchain can also be referred to as a "regular select," while selecting from multiple blockchains can be referred to as a "complex select." As shown in the example below, the SELECT command includes retrieving data from two fields (FieldName1 and FieldNameN), in addition to a database name and a blockchain name. In one embodiment, a SELECT command can only be performed after the system has created a database in response to a CREATE DATABASE command and created a blockchain for the database in response to a CREATE BLOCKCHAIN command.

SELECT <FieldName1>[.<BlockchainAlias>],
    <FieldNameN>[.<BlockchainAlias>],
    . . .
    FROM   <DatabaseName>.<BlockchainName>[<BlockchainAlias>]
    [JOIN <DatabaseName>.<BlockchainName><BlockchainAlias>
    ON <FieldName>.<BlockchainAlias1>{=, <, >, >=, <=, !=}
    <FieldName>.<BlockchainAlias2>]
    . . .
    [WHERE  <FieldName>.<BlockchainAlias>{=,  <,  >, >=,!=}<Value>]
    . . .
    [ORDERBY <FieldName1>.<BlockchainAlias><ASC>]
    . . .
    [TOP <Positive Int>]
    [MIDDLE <Positive Int>]
    [BOTTOM <Positive Int>]
    . . .
    [COUNT <FieldName1>.<BlockchainAlias>]
    . . .
    [HISTORY ([Time Parameter (INITIALSTATE, PREVIOUSSTATE, LIFETIME, STATE (default for all selects)<FieldName1>.<BlockchainAlias>)
    . . . ]
    . . .
    [other SELECT specific functions]

The JOIN clause can be used to specify one or more blockchains and field values to relate to other blockchains. In one embodiment, the system joins data from one more blockchains by performing the SELECT operation on each blockchain and then merges the results. In one embodiment, the system performs the join by comparing a selected element from a first blockchain (e.g., BlockchainAlias1) to each selected element from a second blockchain (e.g., BlockchainAlias2) based on the join conditional.

In one embodiment, where the data from two or more blockchains are formatted in the same way, the system relates the data without performing a normalization process. Where the data from two or more blockchains are formatted differently, a normalization process can be performed prior to relating the data. Without the functionality provided by the JOIN clause, the blockchains would be independent data stores with denormalized data structures and no referential integrity or abilities to join data to and from other blockchains.

The WHERE clause filters the data records returned from the SELECT command using a field name, a comparison operator (e.g., =, <, >, >=, <=, !=), and a value. For example, a WHERE clause can filter the data records by data by only including data records before or after a specified date value.

The ORDERBY clause sorts the specified field and a sorting direction (e.g., ASC, DESC). For example, if the specified field is date of birth for users, the ORDERBY clause organizes all users in order by their date of birth, either ascending or descending in time.

The TOP, MIDDLE, or BOTTOM clauses specify a selection of a subset of the retrieved data records. For example, if the data returned is a list of names, the integer value of five provided for the TOP clause returns the first five names, the integer value of five provided for the MIDDLE clause returns the middle five names, and the integer value of five provided for the BOTTOM clause returns the last five names. In one embodiment, these clauses are used to limit the number of data records returned from the SELECT command.

The COUNT clause returns a count of the number of data records returned from the SELECT command.

The HISTORY clause specifies which amendments of a record should be retrieved. For example, a user starts out with a phone number of 1112223333, changes it to 2223334444, and then changes it to 3334445555. The value returned for the INITIALSTATE clause would be the initial value of that user's phone number: 1112223333. The value returned for the PREVIOUSSTATE clause would be the previous value of the user's phone number: 2223334444. The value returned for the LIFETIME clause would be all of the values the user had set as their phone number: 1112223333, 2223334444, and 3334445555. In one embodiment, these clauses are used to monitor how a variable has changed.

The INSERT command inserts (or writes) data into a blockchain but does not mine the data. The INSERT command takes a database name, a blockchain name, and a series of field names and field values. Optionally, an OUT PUT clause may be specified to return values of fields just inserted or written.

INSERT <DatabaseName>.<BlockchainName>
<FieldName1>[.<BlockchainName>],
[<FieldNameN>[.<BlockchainName>], . . . ]
VALUE <Field1Value>,
[<FieldNValue>, . . . ]
. . .
OUTPUT<FieldName1>,
[<FieldNameN>, . . . ]
. . .
[other INSERT specific functions]

The DETACH command allows a relational blockchain database to be taken offline and its binary files to be copied, moved, or deleted from a bSQL server. Optionally, instead of an entire blockchain database, a single blockchain may be taken offline by specifying the blockchain name. In the detaching process, the system does not modify stored records, but amends the SysDatabases and/or the SysBlockchains blockchains to specify whether a specific blockchain is detached. When a specific blockchain is detached, the system will no longer reference that specific blockchain and queries cannot be performed on it (unless it is reattached).

DETATCH <DatabaseName>[<BlockchainName>]

The ATTACH command allows a database and its collection of blockchains to be brought online by specifying the database name and the folder directory of its blockchain binary files. Optionally, a single blockchain can be specified to attach a single blockchain instead of the entire database. The attaching process also allows previously detached blockchains or databases to be reattached.

ATTACH <DatabaseName>[.<BlockchainName>] <Folder Directory>

The MINE command submits unmined blocks on a blockchain to the distributed peer-to-peer network for mining by specifying a database name and a blockchain name.

MINE <DatabaseName>.<BlockchainName>

The EVOLVE command allows a blockchain field structure to be modified. The command takes a database name, a blockchain name and a series of field names followed by field specific properties, including a field name, a field data type (e.g., int, string, universally unique identifier (UUID), Boolean, bytes, etc.), default, and nullable. The system can modify the properties in the SysBlockchains and SysFields blockchain based on parameters in an EVOLVE command. In one embodiment, the EVOLVE command is not retroactive and has no effect on existing data because data written to the blockchain is immutable. The EVOLVE command alters the field structure of the blockchain going forward. In one embodiment, after the changes have been made, the system updates a lifetime index of modified blockchain denoting at what block and record count the schema was changed.

EVOLVE <DatabaseName>.<BlockchainName>
(<FieldName1><FieldType>[(<FieldSize>)]
[default(<defaultValue>)] [nullable],
<FieldNameN>, . . . )

Figure 7:
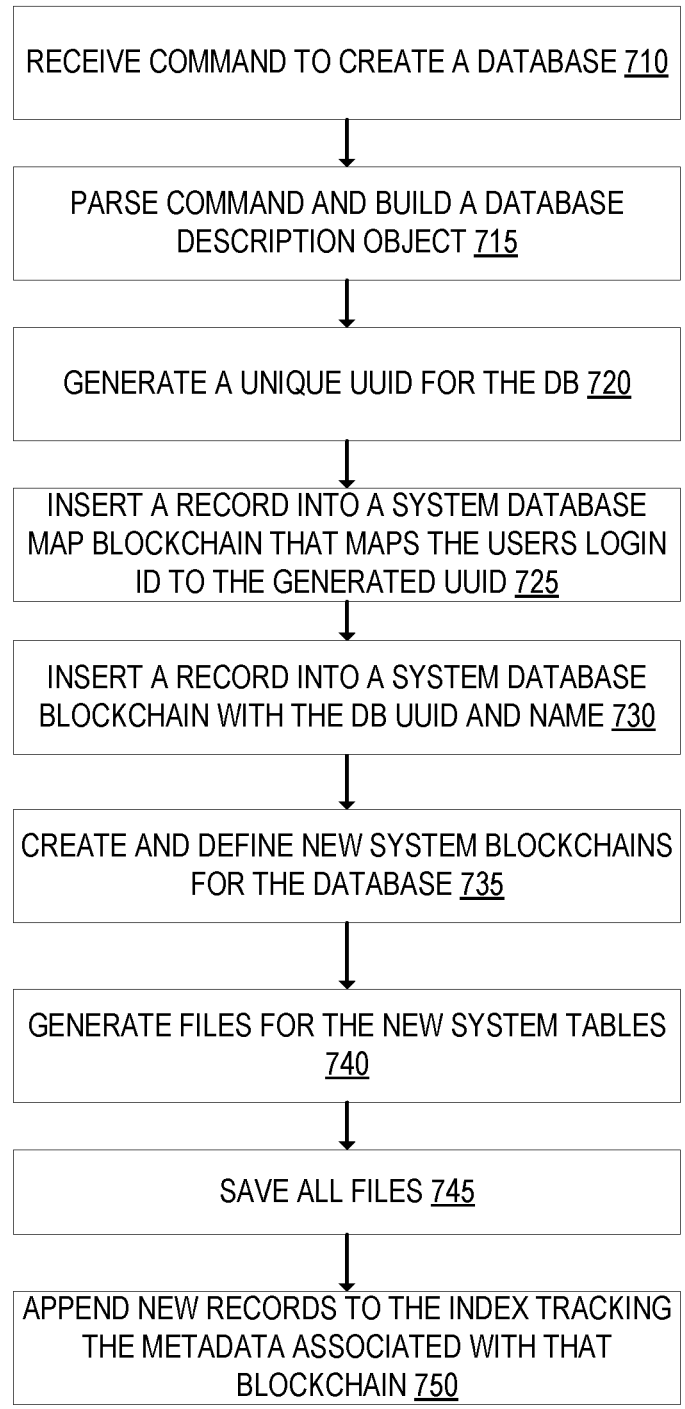
FIG. 7 is a flow diagram that illustrates exemplary operations for creating a database, according to an embodiment.

FIG. 7 is a flow diagram that illustrates exemplary operations for creating a relational blockchain database, according to an embodiment. The operations of FIG. 7 are described as being performed by the relational blockchain database server 105.

At operation 710, the relational blockchain database server 105 receives a command to create a relational blockchain database. The command may be the CREATE DATABASE command previously described herein and may take in a database name parameter. Next, at operation 715, the relational blockchain database server 105 parses the command and builds a database description object that includes the database name parameter and may include information of the user that created it. For instance, it may be a prerequisite for a user to be logged into the system prior to creating a database. Next, at operation 720, the relational blockchain database server 105 generates a unique universal identifier (UUID) for the database being created. The UUID may be created with a random number generator.

Next, at operation 725, the relational blockchain database server 105 inserts a record into a system database map blockchain that maps the user's login identifier to the generated UUID for the database. For instance, with respect to FIG. 4, the relational blockchain database server 105 inserts a record into the SysDatabaseMapLogin blockchain 450 that maps the user's login identifier to the database identifier. The record may be written to the system database map in accordance with FIG. 10 according to an embodiment.

Next, at operation 730, the relational blockchain database server 105 inserts a record into a system database blockchain with the UUID for the database and the name of the database given in the command. For instance, with respect to FIG. 4, the relational blockchain database server 105 inserts a record into the SysDatabases blockchain 440 with the databaseID field set to the generated UUID and the databasename field set to the name provided in the command. The record may be written to the system database map in accordance with FIG. 10 according to an embodiment.

Next, at operation 735, the relational blockchain database server 105 creates and defines new system blockchains for the database. For instance, the relational blockchain database server 105 may generate a system blockchain (e.g., a SysBlockchains blockchain 310), a system fields blockchain (e.g., a SysFields blockchain 320), a system users blockchain (e.g., a SysUsers blockchain 330), and a system tokens blockchain (e.g., a SysTokens blockchain 340), and insert parameters for the new system blockchains. Each new system blockchain is generated with a genesis block (e.g., an empty container containing a default proof and the record data for the system blockchain).

Next, at operation 740, the relational blockchain database server 105 generates files for the new system tables. In one embodiment, the relational blockchain database server 105 generates the following blockchains for a user-defined relational blockchain database: SysBlockchains, SysFields, SysTokens, and SysUsers. The relational blockchain database server 105 can then populate SysBlockchains and SysFields in System Relational Blockchain Database 408 with metadata describing the blockchains defined for the user-defined relational blockchain database.

Next, at operation 745, the relational blockchain database server 105 saves all files. At operation 750, which is optional in some embodiments, the relational blockchain database server 105 appends new records to an index, tracking the metadata associated with that blockchain. For instance, the database is mapped to live fields and blockchains.

Figure 8:
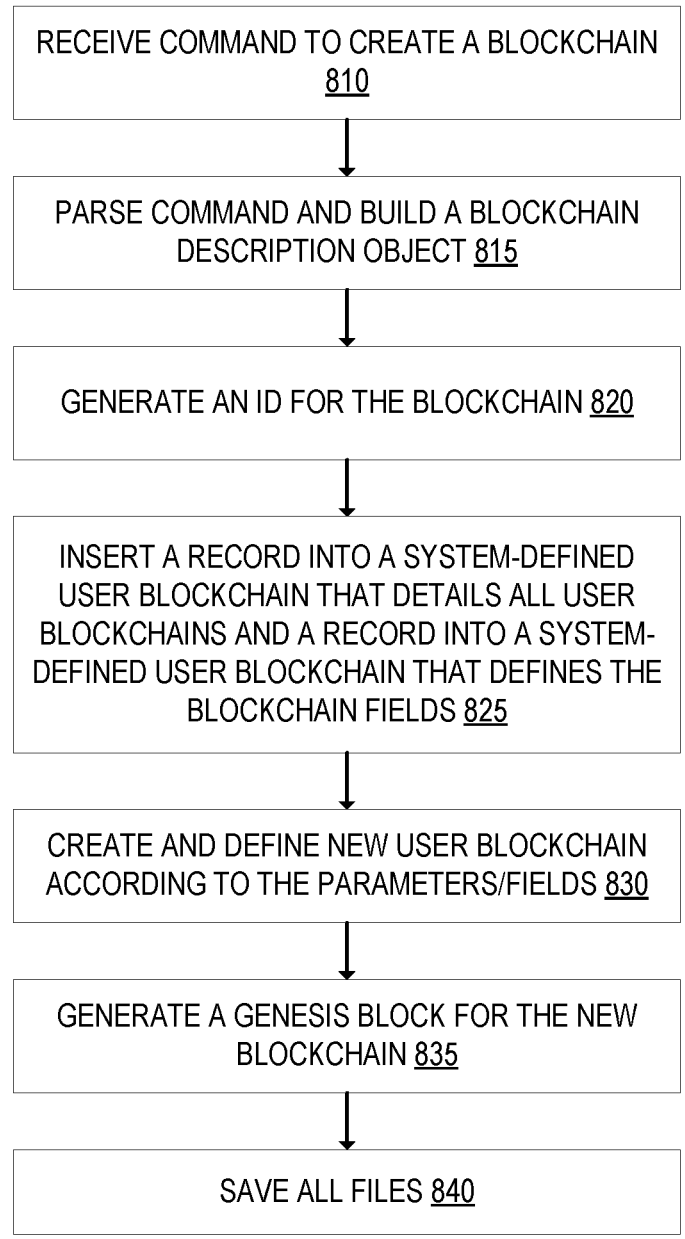
FIG. 8 is a flow diagram that illustrates exemplary operations for creating a user-defined blockchain, according to an embodiment.

FIG. 8 is a flow diagram that illustrates exemplary operations for creating a user-defined blockchain, according to an embodiment. The operations of FIG. 8 are described as being performed by the relational blockchain database server 105.

At operation 810, the relational blockchain database server 105 receives a command to create a relational blockchain. The command may be the CREATE BLOCKCHAIN command previously described herein and may take in a database name parameter, a blockchain name parameter, and may take one or more blockchain specific parameters (e.g., automine, transactionthreshold, allowoverflow, etc.), in addition to one or more fields and field specific properties (e.g., field name, field data type, default, nullable, etc.). Next, at operation 815, the relational blockchain database server 105 parses the command and builds a blockchain description object that includes the blockchain name parameter and may include information of the user that created it. For instance, it may be a prerequisite for a user to be logged into the system prior to creating a blockchain. Next, at operation 820, the relational blockchain database server 105 generates an identifier for the blockchain being created (e.g., a blockchainID). The identifier may be an incremented value of the last blockchain identifier that was created.

Next, at operation 825, the relational blockchain database server 105 inserts a record into a system-defined user blockchain that details all user blockchains (e.g., SysBlockchains blockchain 310) and a system-defined user blockchain that defines the blockchain fields (e.g., SysFields blockchain 320). The records may be written to these blockchains in accordance with FIG. 10 according to an embodiment.

Next, at operation 830, the relational blockchain database server 105 creates and defines the new user defined blockchain according to the given parameters and fields including generating a new file for that blockchain. Next, at operation 835, the relational blockchain database server 105 generates a genesis block for the new blockchain (e.g., an empty container containing a default proof and the record data for the blockchain). Next, at operation 840, the relational blockchain database server 105 saves all files.

II. Writing Data to the Blockchain

Many commands trigger the writing of data to blocks. In one embodiment, a write command starts by defining the fields that are going to be written, the name of the relational blockchain database the data will be written to, the blockchain being accessed, and the user who initiated the write command. The system then normalizes the data received. In one embodiment, the system normalizes the data by ensuring that database names, blockchain names, and field names are alphanumeric and composed of lowercase ASCII characters. The system uses the login identifier from the user's token object and the database name to lookup the blockchain database's corresponding DatabaseID by reading data from the SysDatabaseMapLogins and SysDatabases blockchains. Using the DatabaseID, the system performs I/O operations to access data in the SysBlockChains and SysFields blockchains. For example, the system loads the metadata indicating the fields in the SysFields blockchain mapped to the blockchain database the data will be written to, including FieldID, FieldName, FieldSize, FieldType, etc. The system then determines whether the write command is for creating a new record or amending a previously created record. In one embodiment, the system determines that the write command is to amend a previously created record when an identifier was passed with the INSERT command and the identifier corresponds to a previously created record. Otherwise, the system determines the write command is for a new record.

In one embodiment, when the record exists, the system converts all corresponding fields into bytes, generates a byte array mapping FieldIDs to the record, and queues the fields for commitment to the blockchain.

In one embodiment, where the record does not exist, the system references the metadata associated with the blockchain to see if the record can be inserted. The system checks if all of the records are of the same type. The system replaces any null values with default values, where default values exist. If any values are still missing, the system checks if the field is nullable. If the field is nullable, the process continues, otherwise an error is returned. If the process can continue, the system determines whether the fields are the correct size and do not exceed size limits. The system then generates a byte array corresponding to their FieldIDs and converts all of the records to bytes corresponding to their datatype. In one embodiment, the system adds delimiters to the values, and queues the values for commitment to the blockchain.

Once the data has been committed, the system puts the data into a temporary hash store that allows the data to sit in an immutable state while waiting for the block to be mined. In one embodiment, the system determines whether the blockchain has been set to be automatically mined (e.g., from the AutoMine field in SysBlockchains). If the blockchain is not set to be automatically mined, the system stores the block in a temporary memory space until receiving an instruction to mine the blockchain. If the blockchain is set to be automatically mined, the system determines if the length of the queue is greater than a transaction threshold (e.g., from the TransactionThreshold field in SysBlockchains). When the length of the queue is greater than a transaction threshold, the system determines whether overflow is allowed (e.g., from the AllowOverflow field in SysBlockchains). When overflow is not allowed, the system selects a TransactionThreshold equivalent of records from the queue, commits the selected records to a new block, and repeats until the number of records in the queue is below the TransactionThreshold. When overflow is allowed, the system batches all of records in the queue and commits the records to a new block.

Figure 9:
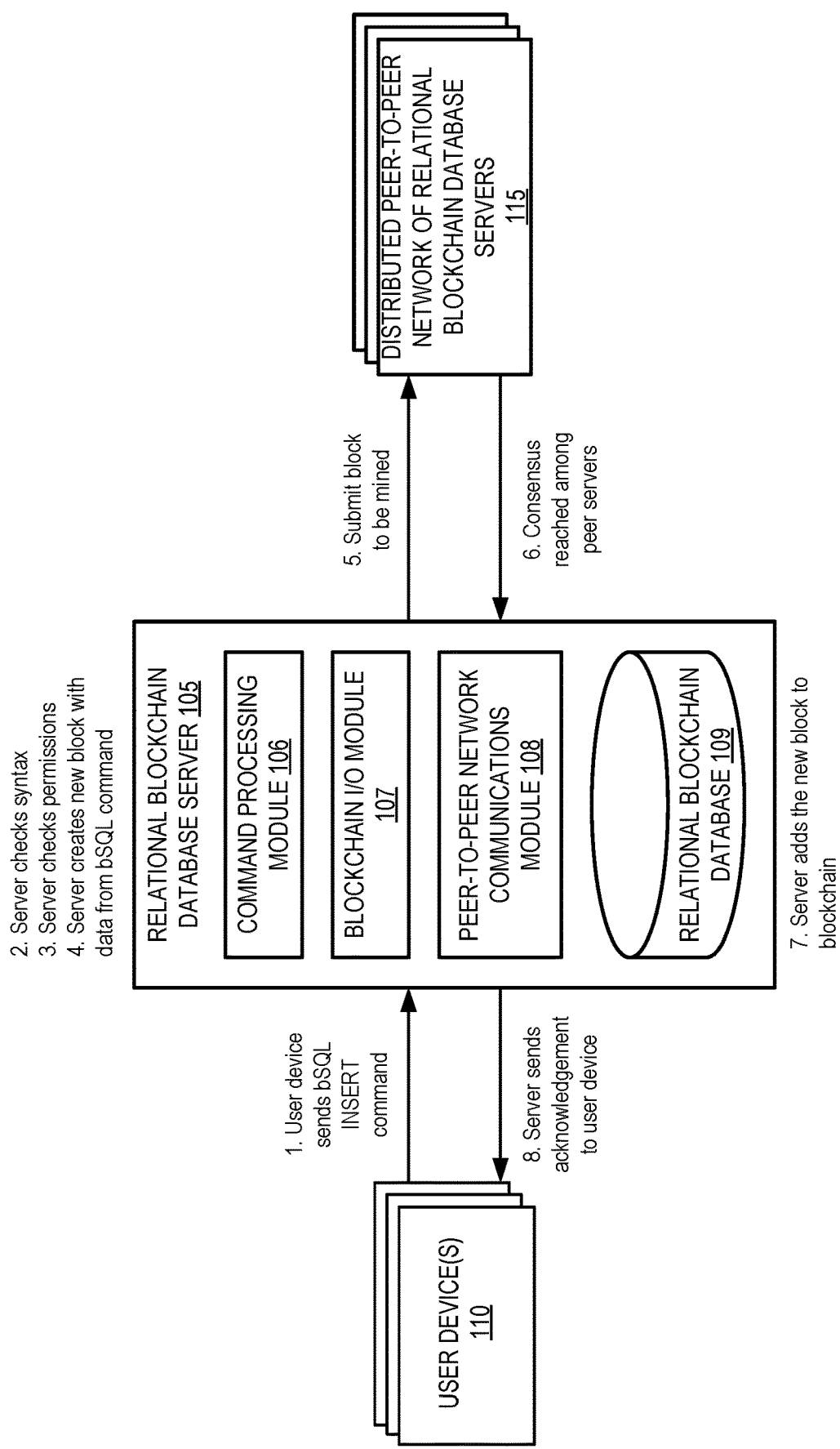
FIG. 9 is a block diagram that illustrate exemplary operations for writing to a relational blockchain database, according to an embodiment.

FIG. 9 is a block diagram that illustrate exemplary operations for writing to a relational blockchain database, according to an embodiment. At operation 1, user device 110 sends a bSQL INSERT command to relational blockchain database server 105, where the command includes a database name, a blockchain name, and a series of field names and field values for insertion as new data to the blockchain specified by the blockchain name. At operation 2, relational blockchain database server 105 checks the syntax of the command. At operation 3, relational blockchain database server 105 verifies the permissions of a user associated with the INSERT command. Once the user's permissions have been verified, at operation 4, relational blockchain database server 105 creates a new block with the data to be written from the bSQL command. At operation 5, relational blockchain database server 105 submits the new block to distributed peer-to-peer network of relational blockchain database servers 115 for mining. At operation 6, a notification is sent back to relational blockchain database server 105 after consensus is reached among the peer servers of distributed peer-to-peer network of relational blockchain database servers 115. At operation 7, relational blockchain database server 105 adds the new block to the designated blockchain. At operation 8, relational blockchain database server 105 sends an acknowledgement of insertion to user device 110.

Figure 10:
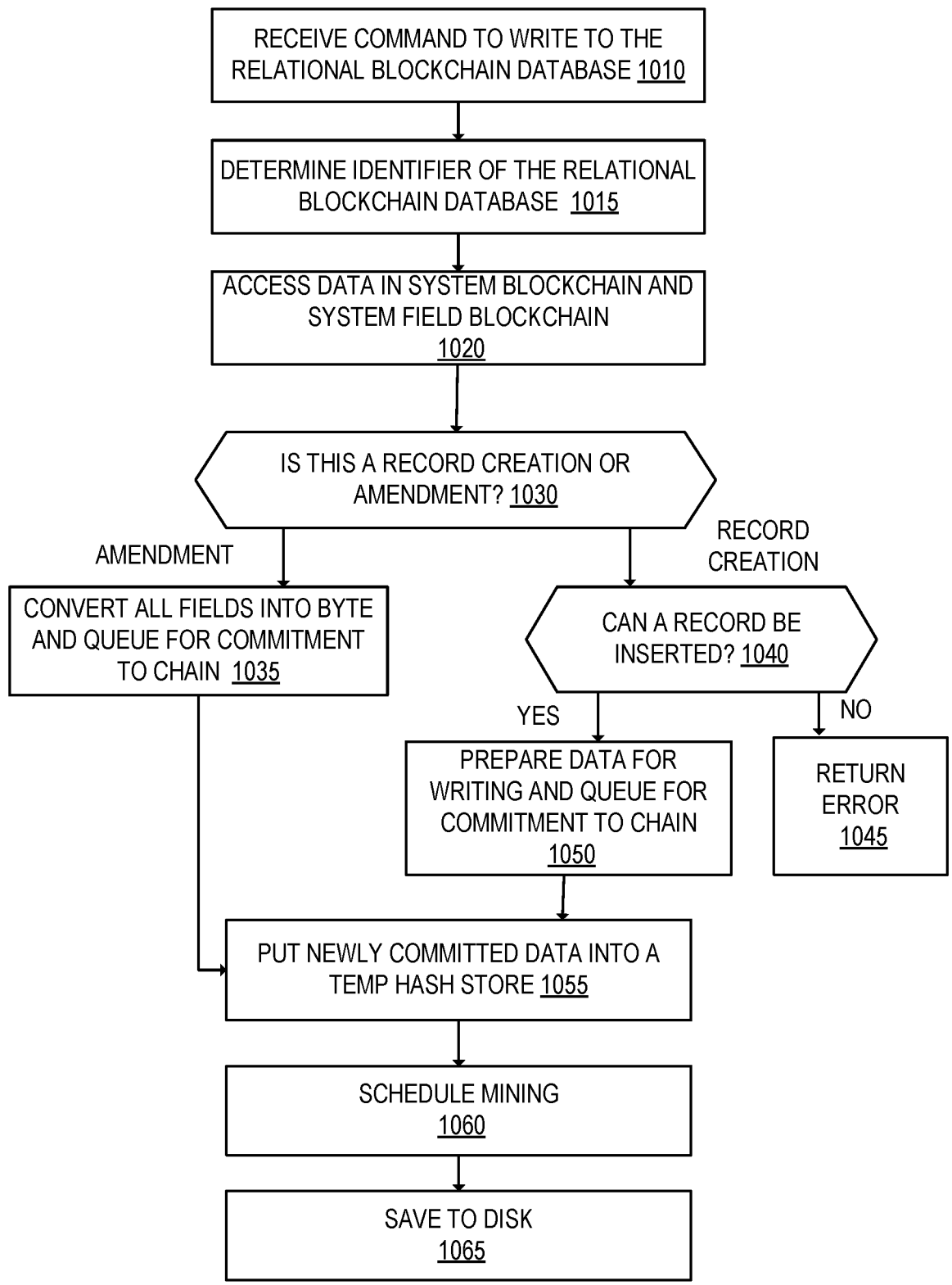
FIG. 10 is a flow diagram that illustrates exemplary operations for writing a relational blockchain database, according to an embodiment.

FIG. 10 is a flow diagram that illustrates exemplary operations for writing to a relational blockchain database, according to an embodiment. The operations of FIG. 10 are described as being performed by the relational blockchain database server 105.

At operation 1010, the relational blockchain database server 105 receives a command to write to a relational blockchain database. This command may be the INSERT command and may take a database name, a blockchain name, and a series of field names and field values. The relational blockchain database server 105 may normalize the data of the command to write to the relational blockchain database. For instance, in an embodiment, all database names, blockchain names, and field names are required to be alphanumeric and required to be lowercase ascii characters. The relational blockchain database server 105 may normalize the data to comply with these requirements. When inserting a record, if the command does not contain an ID that corresponds to a previous record, the relational blockchain database server 105 assumes that a new element is being added to the database. If the command refers to an ID corresponding to an existing record, then the insert is treated as an amendment to previous data and does not include non-nullable fields. The command to write to the database may be triggered by other commands including the CREATE DATABASE command.

Next, at operation 1015, the relational blockchain database server 105 determines the identifier of the relational blockchain database pertaining to the write. For instance, using the login identifier of the user's token object and the database name provided in the command, the corresponding database identifier is determined. With respect to FIG. 4, the SysDatabaseMapLogin blockchain 450 and the SysDatabases blockchain 440 are read to determine the identifier of the database (e.g., the DatabaseID). The relational blockchain database server 105 reads the SysDatabases blockchain 440 to map the user's login to the DatabaseID corresponding to the DatabaseName provided in the command.

Next, at operation 1020, the relational blockchain database server 105 accesses data in the system-defined user blockchain that stores information about the user blockchains and the system-defined user blockchain that stores information about the fields of the user blockchain, and loads the corresponding metadata related to the fields of the blockchain. For instance, with respect to FIG. 3, the relational blockchain database server 105 accesses the SysBlockchains blockchain 310 and the SysFields blockchain 320 and loads the corresponding metadata pertaining to the fields, their size, their name, their type, etc. (e.g., the FieldID, BlockchainID, FieldName, FieldType, FieldSize).

Next, at operation 1030, the relational blockchain database server 105 determines if the write is for a new record or an amendment to an existing record. For instance, if the command does not contain an ID that corresponds to a previous record, the relational blockchain database server 105 assumes that a new element is being added to the relational blockchain database. If the command refers to an ID corresponding to an existing record, then the insert is treated as an amendment to previous data and does not include non-nullable fields. If the write is for an amendment, then operations move to operation 1035. If the write is for a new record, then operations move to operation 1040.

At operation 1035, the relational blockchain database server 105 converts all fields of the blockchain in which the write is to occur into bytes, generates a byte array mapping the fieldIDs to the record, and queues the write for commitment to the blockchain. Operations then move to operation 1055.

At operation 1040, the relational blockchain database server 105 determines whether a record can be inserted. For instance, the relational blockchain database server 105 may reference all the metadata associated with the blockchain to see if the record can be inserted including checking to determine if all records are of the same type, check if any missing values are nullable (if not nullable, return an error), and checking that all fields are the correct size and do not exceed their limit. If a record can be inserted, then operation 1050 is performed otherwise operation 1045 is performed where an error is returned. At operation 1050, the relational blockchain database server 105 prepares the data for writing and queues for commitment to the blockchain. For instance, the relational blockchain database server 105 replaces any null values with default values (if exists), orders the values and create a byte array corresponding to their field identifiers, converts all of the records to bytes corresponding to their data type, adds delimiters to the values, and queues all values for commitment to the blockchain. Next, operation 1055 is performed.

At operation 1055, the relational blockchain database server 105 puts the newly committed data into a temporary hash store. This allows the data to sit in an immutable state while waiting for the block to be mined. Next, at operation 1060, the relational blockchain database server 105 schedules mining for the block. In an embodiment, the relational blockchain database server 105 determines whether the blockchain has been set to be automatically mined (e.g., the relational blockchain database server 105 accesses the AutoMine field in the SysBlockchains blockchain 310 for the blockchain that is to be written to see if it is automatically mined). If the blockchain is not set to be automatically mined (e.g., AutoMine=FALSE), the block is stored in a temporary memory space until receiving an instruction to mine the blockchain. If the blockchain is set to be automatically mined (e.g., AutoMine=TRUE), the system determines if the length of the queue is greater than a transaction threshold (e.g., from the TransactionThreshold field in SysBlockchains). When the length of the queue is greater than a transaction threshold, the system determines whether overflow is allowed (e.g., from the AllowOverflow field in SysBlockchains). When overflow is not allowed, the system selects a TransactionThreshold equivalent of records from the queue, commits the selected records to a new block, and repeats until the number of records in the queue is below the TransactionThreshold. When overflow is allowed, the system batches all of records in the queue and commits the records to a new block. Next, at operation 1065, the relational blockchain database server 105 saves the data to disk when AutoMine is TRUE. Where AutoMine is FALSE, the relational blockchain database server 105 queues the data to be mined (e.g., in response to a manual instruction to mine the data).

III. Reading Data from the Blockchain

Many commands trigger some form of a read. For example, a command can trigger a single record read or a more complex table search. In an embodiment, a read command specifies a relational blockchain database, one or more blockchains, a list of field names to return, and a number of optional clauses to filter results being returned. The read command may be a SELECT command as previously described herein. Responsive to receiving the read command, the relational blockchain database server 105 validates syntax and permissions and then reads and returns data. The data may be returned as plain text with field delimiters and row delimiters. A command may read data from a single blockchain or from multiple blockchains. The multiple blockchains may be in the same database or different databases. In an embodiment, the relational blockchain database server 105 uses one or more JOIN commands to utilize relationships between blockchains to build results, including inner joins, outer joins, and cartesian joins.

a. Reading a Whole Blockchain

In one embodiment, the system performs a read of an entire blockchain using a blockchain identifier and a database name or identifier. In such embodiments, the system extracts the BlockchainID and DatabaseID from the command and uses the values to locate the memory location of the data. In one embodiments, blockchain databases are stored at $ROOTDIR\{DATABASEID}\, and a specific blockchain is referenced by $DATABASEDIR\{BLOCKCHAINNAME}\. In one embodiment, to pull up the specified blockchain information, the system needs to know more information about what the data looks like. To do this, the system pulls up corresponding system tables, determines the page location of the SysBlockchains and SysFields blockchains, pages the data into memory, checks for items corresponding to the specified blockchain, and starts saving its metadata into memory. In one embodiment, when the system reads records from an entire blockchain, the system retrieves the records in chronological order, starting with the first block. In one embodiment, the blocks in the blockchain are stored on a series of pages in a storage directory. The system uses the metadata to generate a field map of the records to read from the page(s). The system locates the first page reference and last page reference of the desired data, retrieves the first page, and loads the data into a memory. In one embodiment, the system maps the records to their corresponding field type and converts the records back to their native data types because the records are stored as byte arrays. The system then performs checks on the data (e.g., different conditionals, comparing to a static value, conditionals compared to another blockchain's record value, etc.). If the conditionals pass, the system loads the data into a temporary memory space to be used by another function. In one embodiment, the system returns data as plain text with field delimiters and row delimiters.

b. Reading a Specific Record from a Blockchain

In one embodiment, to read a specific record from a specific blockchain, the system first loads all of the metadata for the specific blockchain so that the system knows how to parse the records of the specific blockchain.

In one embodiment, if the system knows where the record is stored, the system uses the memory location of the record to retrieve the page of data storing the record and load it directly into memory.

In one embodiment, if the system does not know where the record is stored, the system performs the same steps described above for reading a whole blockchain, but instead of keeping all of the records in memory and converting them back to their specified data types and formats, the system will only read the fields corresponding to the desired blockchain FieldIDs and load those into memory.

After the data is read and loaded into memory, the system then performs checks on the data (e.g., different conditionals, comparing to a static value, conditionals compared to another blockchain's record value, etc.). If the conditionals pass, the system loads the data into a temporary data to be used by another function.

In an embodiment, an index is not used when writing or reading to the blockchain. In such an embodiment, the system parses the entire blockchain and either builds a cache or creates a temporary file that stores the records as they are accumulated. For instance, the system would start at the initial block, parse all the records in that block and load them into a cache or temporary file (all records are indexed by their primary key and if a record does not exist the entire object is inserted into the cache or temporary file, and if a record does exist the values defined in the record are updated in the cache or temporary file), and repeat for all N blocks. The cache or temporary file can be stored in a hash map. Instead of starting at the initial block, the system can start at the last block and work its way to the initial block storing only what is not included in the object.

If an index is used and defined for the primary key (which is sometimes referred herein as the lifetime index), the system uses the index to access records in a faster manner than if there was not an index. The system loads the index, looks at the life record of each block (the life record indicates whether each record in the block is in a current state), and loads the elements that are in current state.

In an embodiment, an index is used when reading records from the blockchain that require conditional queries to be performed on the records. The system loads the index and uses it to filter out the records that satisfy the specified conditionals. Then it uses the pre filtered list to reference and perform only the required I/Os to fetch all of the data. This prevents the system from performing unnecessary reads.

c. High-Level Read Functions

In one embodiment, the system uses indices to increase the query efficiency of a specific set of data by storing a sorted state representation of the specific set of data. In one embodiment, the system uses indices when there is a corresponding conditional logic that is required to be performed on the data to filter the selected records. For example, if a user wants to select all users older than age 21, the user can create an index that tracks the fields "birthday" or "age" in a blockchain. In response to a query for the fields "birthday" or "age", the system can recognize that there is a sorted index representing the query conditional. This allows the system to perform I/Os only on the records that satisfy the conditional, opposed to all records.

If the system is reading data and the system has an index for the data sorted by the same dynamic value, the system can start paging the index into memory and read its values. Parsing the index allows the system to quickly find the location of a specific record or a range of records. Once located, the system performs similar operations as when reading a specific record from a specific blockchain, as described above.

Figure 11:
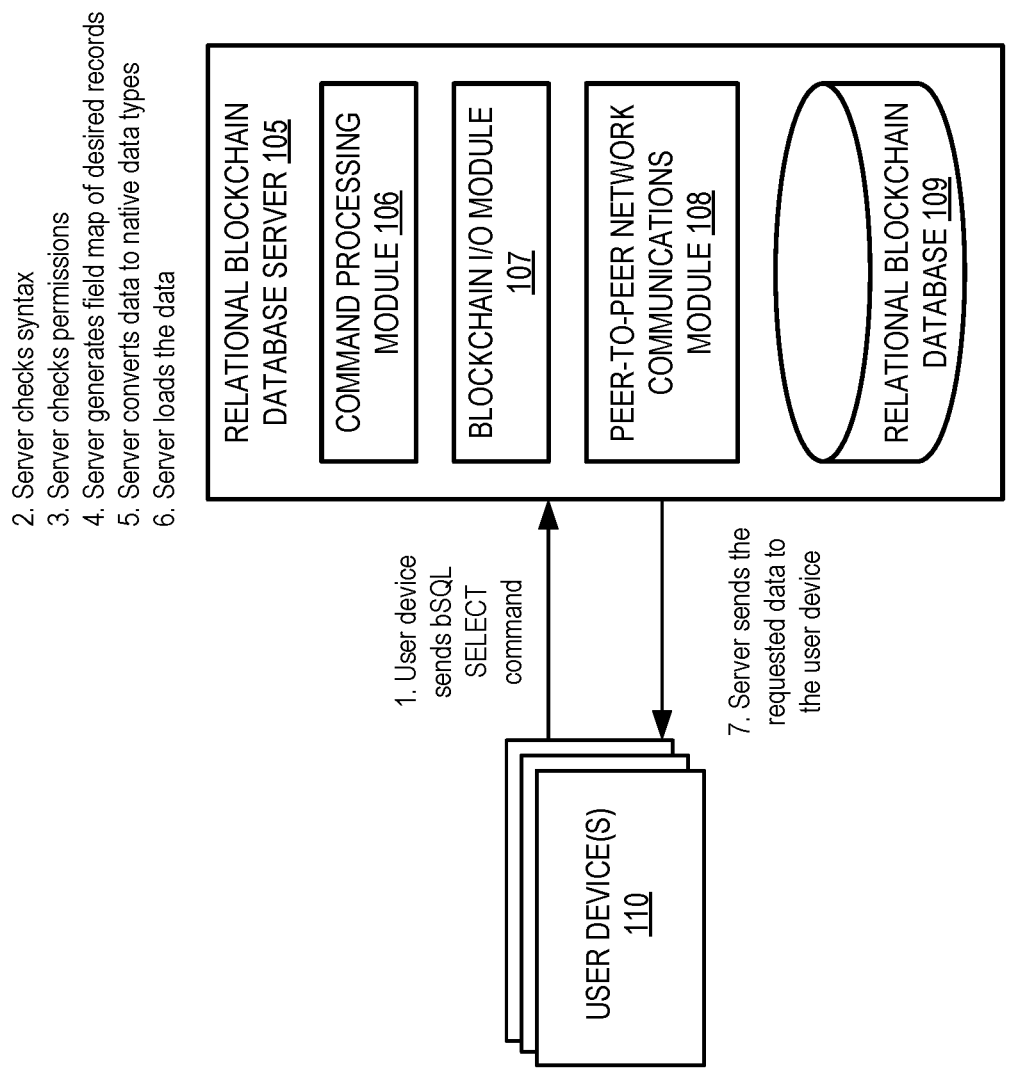
FIG. 11 is a block diagram that illustrate exemplary operations for reading data from a relational blockchain database, according to an embodiment.

FIG. 11 is a block diagram that illustrate exemplary operations for reading data from a relational blockchain database, according to an embodiment. At operation 1, user device 110 sends a bSQL SELECT command to relational blockchain database server 105, where the command includes a database name and a blockchain name within the database from which to read data. At operation 2, relational blockchain database server 105 checks the syntax of the command. At operation 3, relational blockchain database server 105 verifies the permissions of a user associated with the INSERT command. Once the user's permissions have been verified, at operation 4, relational blockchain database server 105 generates a field map of the desired records from the specified blockchain. At operation 5, relational blockchain database server 105 converts the data from a common data type (e.g., bytes) to their native data types. At operation 6, relational blockchain database server 105 loads the converted data. At operation 7, relational blockchain database server 105 sends the requested data to user device 110.

Figure 12:
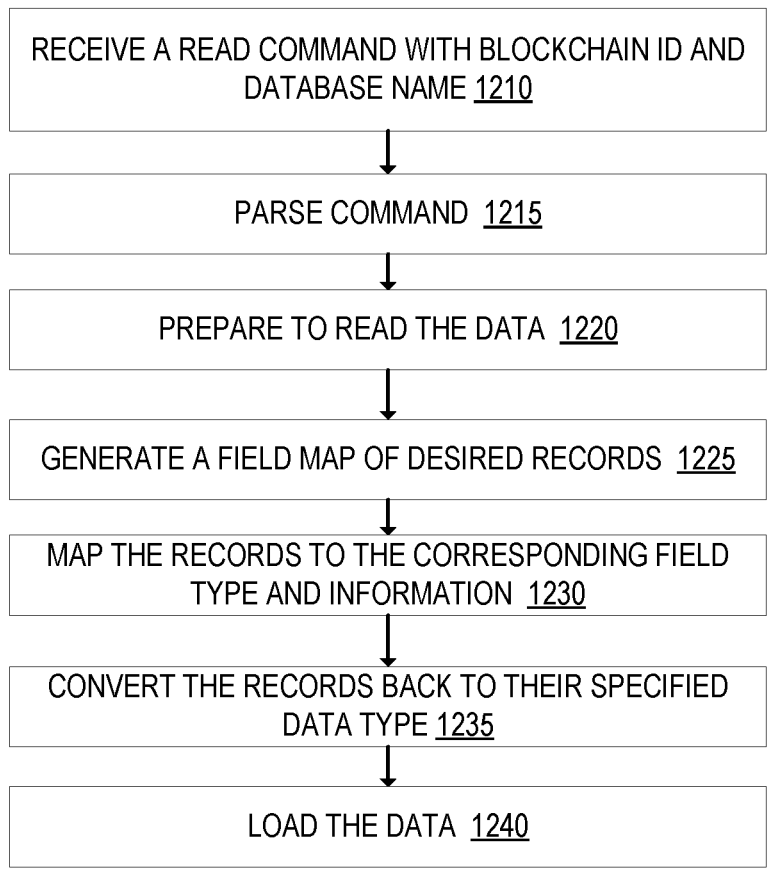
FIG. 12 is a flow diagram that illustrates exemplary operations for reading from a relational blockchain database, according to an embodiment.

FIG. 12 is a flow diagram that illustrates exemplary operations for reading from a relational blockchain database according to an embodiment. The operations of FIG. 12 are described as being performed by the relational blockchain database server 105. The operations of FIG. 12 describe reading an entire blockchain.

At operation 1210, the relational blockchain database server 105 receives a command to read from the database. The command may include the database name and a blockchain name within the database from which to read. By way of example, the command may be a SELECT command as previously described herein. Next, at operation 1215, the relational blockchain database server 105 parses the command and extracts the corresponding fields (e.g., the database name, blockchain name, and any field name). The extracted fields are used to locate the memory location of the data. Next, at operation 1220, the relational blockchain database server 105 prepares to read the data. For instance, the relational blockchain database server 105 accesses one or more system blockchains to determine where the data is stored and how the data is formatted. For instance, the relational blockchain database server 105 determines the page location of the SysBlockchains blockchain 310 and the SysFields blockchain 320, starts paging the data into memory, checks for items corresponding to the specified blockchain, and starts saving its metadata into memory. The data is typically grabbed in chronological order starting with the first block.

Next, at operation 1225, the relational blockchain database server 105 generates a field map of all the desired records to be read. The field map may be generated based on the metadata. The first and last page reference of the desired data is determined, and the first page is loaded into memory. Since, in an embodiment, the records are stored as byte arrays, the relational blockchain database server 105 converts the records back to their native type. At operation 1230, the relational blockchain database server 105 maps the records to their corresponding field type and information, and at operation 1235, the relational blockchain database server 105 converts the records back to their specified data types. Next, at operation 1240, the relational blockchain database server 105 loads the data, that may be used by another function. Prior to loading the data, the relational blockchain database server 105 may performs one or more checks on the data (e.g., different conditionals, comparing to a static value, conditionals compared to another blockchain's record value, etc.).

Figure 13:
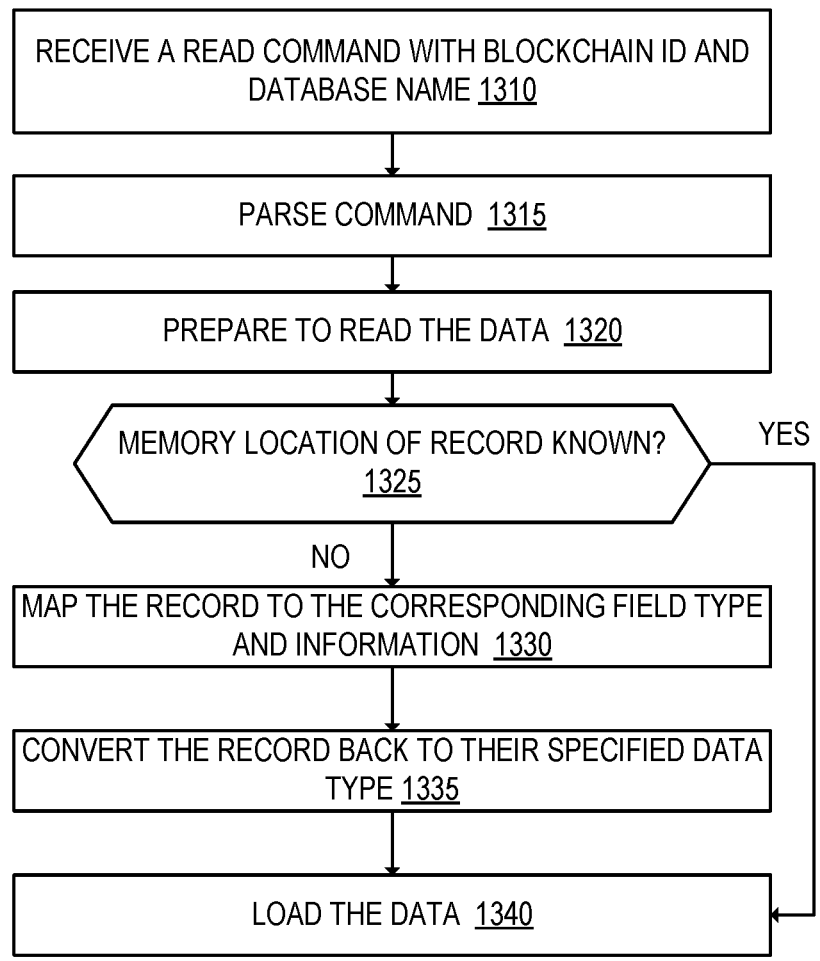
FIG. 13 is a flow diagram that illustrates exemplary operations for reading from a relational blockchain database, according to an embodiment.

FIG. 13 is a flow diagram that illustrates exemplary operations for reading from a relational blockchain database according to an embodiment. The operations of FIG. 13 are described as being performed by the relational blockchain database server 105. The operations of FIG. 13 describe reading a specific record from a blockchain.

At operation 1310, the relational blockchain database server 105 receives a command to read from the database. The command may include the database name and a blockchain name within the database from which to read. By way of example, the command may be a SELECT command as previously described herein. The command may also include an identifier that identifies a record. In one embodiment, the identifier identifying the record is a FieldName, a "*" denoting all fields, or a first-level function that returns a value (e.g., row( ), pow( ), blockid( )). Next, at operation 1315, the relational blockchain database server 105 parses the command and extracts the corresponding fields (e.g., the database name, blockchain name, and the field name). The extracted fields are used to locate the memory location of the data. Next, at operation 1320, the relational blockchain database server 105 prepares to read the data including loading the blockchain metadata into memory. For instance, the relational blockchain database server 105 accesses one or more system blockchains to determine where the data is stored and how the data is formatted. For instance, the relational blockchain database server 105 determines the page location of the SysBlockchains blockchain 310 and the SysFields blockchain 320, starts paging the data into memory, checks for items corresponding to the specified blockchain, and starts saving its metadata into memory. Next, at operation 1325, the relational blockchain database server 105 determines if the memory location of the desired record is known. If it is, then operation 1340 is performed where the data corresponding to that record is loaded and may be used by another function. If the location of the desired record is not known, then operation 1330 is performed. At operation 1330, the relational blockchain database server 105 maps the record to its corresponding field type and information, and at operation 1335, the relational blockchain database server 105 converts the record back to its specified data type. Operation 1340 is then performed. Prior to loading the data, the relational blockchain database server 105 may performs one or more checks on the data (e.g., different conditionals, comparing to a static value, conditionals compared to another blockchain's record value, etc.).

Figure 14:
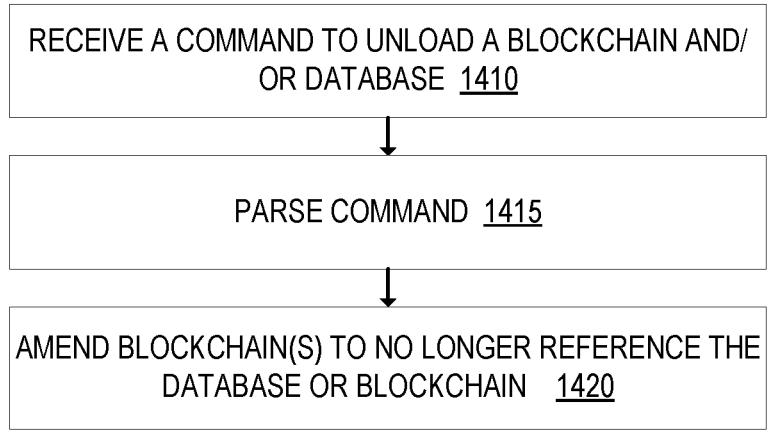
FIG. 14 is a flow diagram that illustrates exemplary operations for unloading a blockchain and/or database from memory, according to an embodiment.

FIG. 14 is a flow diagram that illustrates exemplary operations for unloading a blockchain and/or database from memory according to an embodiment. The operations of FIG. 14 will be described with reference to the exemplary embodiment of the other figures. However, it should be understood that the operations of FIG. 14 can be performed by embodiments of the invention other than those discussed with reference to the other figures, and the embodiments discussed with reference to the other figures can perform operations different than those discussed with reference to FIG. 14. The operations of FIG. 14 are described as being performed by the relational blockchain database server 105.

At operation 1410, the relational blockchain database server 105 receives a command to unload a blockchain and/or database. The command may be a DETACH command as previously described herein. The command may allow a database and/or blockchain to be taken offline and its files copied, moved, or deleted from the server. The command may specify a database name and/or a blockchain name to be unloaded. Next, at operation 1415, the relational blockchain database server 105 parses the received command and extracts the fields (e.g., the specified database name and/or blockchain name). Next, at operation 1420, the relational blockchain database server 105 adds a block, or adds a record for the next block to be added, to the relevant blockchain to indicate that the specified blockchain and/or database is no longer to be referenced or queried. For instance, if the command is to unload a database, a block is added to the system databases blockchain (e.g., the SysDatabases blockchain 440) that specifies that the database is no longer to be referenced and queried, and if the command is to unload a blockchain, a block is added to the system blockchains blockchain (e.g., the SysBlockchains blockchain 410) that specifies that the specific blockchain is no longer to be referenced and queried. Adding the block includes transmitting the block to the distributed P2P network of relational database servers for consensus.

Figure 15:
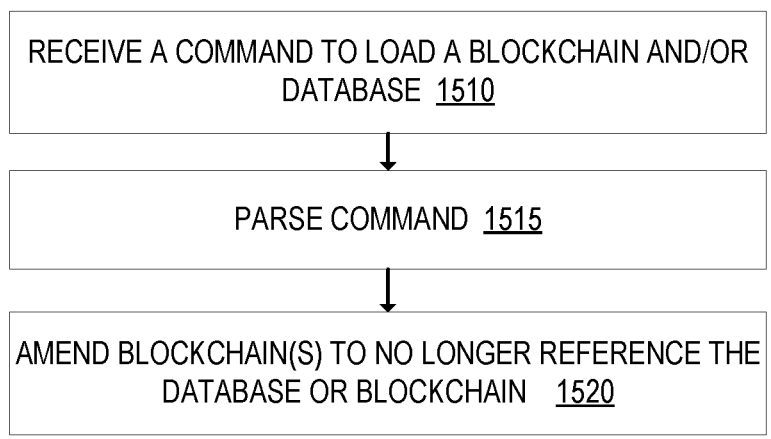
FIG. 15 is a flow diagram that illustrates exemplary operations for loading a blockchain and/or database from a file to memory, according to an embodiment.

FIG. 15 is a flow diagram that illustrates exemplary operations for loading a blockchain and/or database from a file to memory according to an embodiment. The operations of FIG. 15 will be described with reference to the exemplary embodiment of the other figures. However, it should be understood that the operations of FIG. 15 can be performed by embodiments of the invention other than those discussed with reference to the other figures, and the embodiments discussed with reference to the other figures can perform operations different than those discussed with reference to FIG. 15. The operations of FIG. 15 are described as being performed by the relational blockchain database server 105.

At operation 1510, the relational blockchain database server 105 receives a command to load a blockchain and/or database. The command may be an ATTACH command as previously described herein. The command may allow a database and/or blockchain to be loaded from a file to memory, which may occur to add a previously detached set of data to the system. The command may specify a database name and/or a blockchain name to be loaded. Next, at operation 1515, the relational blockchain database server 105 parses the received command and extracts the fields (e.g., the specified database name and/or blockchain name). Next, at operation 1520, the relational blockchain database server 105 adds a block, or adds a record for the next block to be added, to the relevant blockchain to indicate that the specified blockchain and/or database can now be referenced and queried. For instance, if the command is to load a database, a block is added to the system databases blockchain (e.g., the SysDatabases blockchain 440) that specifies that the database in question can now be referenced and queried, and if the command is to unload a blockchain, a block is added to the system blockchains blockchain (e.g., the SysBlockchains blockchain 410) that specifies that the specific blockchain in question can now be referenced and queried. Adding the block to the relevant blockchain includes transmitting the block to the distributed P2P network of relational database servers for consensus.

Figure 16:
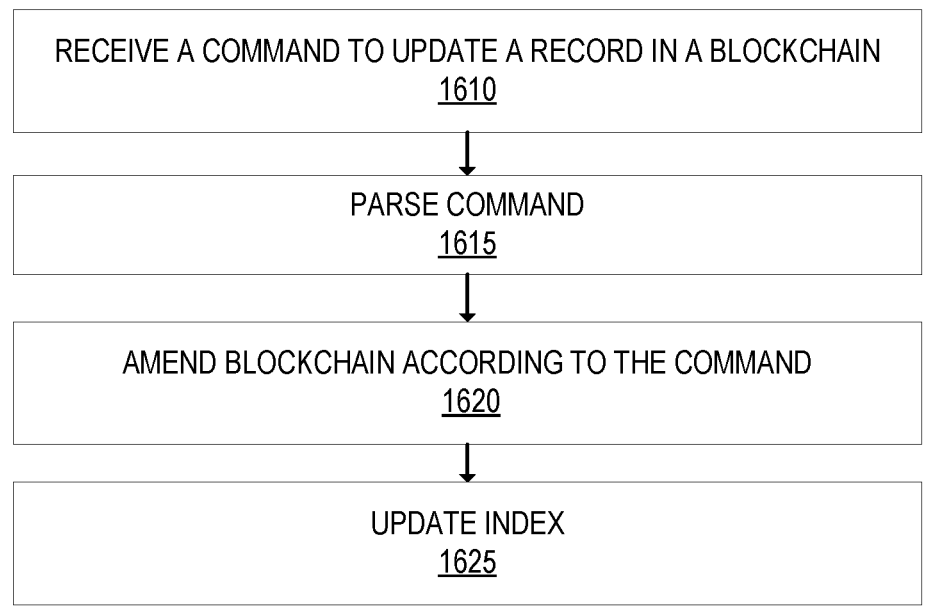
FIG. 16 is a flow diagram that illustrates exemplary operations for updating a record in a blockchain, according to an embodiment.

FIG. 16 is a flow diagram that illustrates exemplary operations for updating a record in a blockchain according to an embodiment. The operations of FIG. 16 will be described with reference to the exemplary embodiment of the other figures. However, it should be understood that the operations of FIG. 16 can be performed by embodiments of the invention other than those discussed with reference to the other figures, and the embodiments discussed with reference to the other figures can perform operations different than those discussed with reference to FIG. 16. The operations of FIG. 16 are described as being performed by the relational blockchain database server 105.

At operation 1610, the relational blockchain database server 105 receives a command to update a record in a blockchain. Since a blockchain is immutable (the data in the blocks cannot be modified), this command is not retroactive and does not change the data already existing in the blockchain. Rather, this command can be used to update the field structure of the blockchain going forward. The command may take in a database name, a blockchain name, and one or more field names followed by field specific properties including a field name, a field data type (e.g., int, string, universally unique identifier (UUID), Boolean, bytes, etc.), default, and/or nullable. The command may be an EVOLVE command as previously described herein. For example, if the user wanted to change the AutoMine field to be true for a particular blockchain, the AutoMine field in the SysBlockchains blockchain 310 will need to be updated. Next, at operation 1615, the relational blockchain database server 105 parses the received command and extracts the fields (e.g., the specified database name, the blockchain name, and the one or more field names and field specific properties). Next, at operation 1620, the relational blockchain database server 105 amends the blockchain according to the command. For instance, a block may be added to the system blockchains blockchain (e.g., the SysBlockchains blockchain 310) that reflects the update, and a block may be added to the system fields blockchain (e.g., the SysFields blockchain 320) to reflect the update in the specified database. Adding the block includes transmitting the block to the distributed P2P network of relational database servers for consensus. Next, at operation 1625, the relational blockchain database server 105 updates the lifetime index of the specified database that specifies the block and record count in which the schema was changed.

Conventional blockchain systems are stand-alone, independent systems, with denormalized data structures and no referential integrity or ability to join data to/form other blockchains. However, the relational blockchain database system described herein allows blockchains to be related together by values in their individual blocks. This allows for selecting data from more than one blockchain even if they are in different relational blockchain databases and/or belong to different users. Further, the commands and relational blockchain database system described herein allows for structured database design principles to be applied to blockchain database design and implementation. Also, it allows utilization of referential data integrity design and implementation principles in blockchain database design and implementation.

Figure 17:
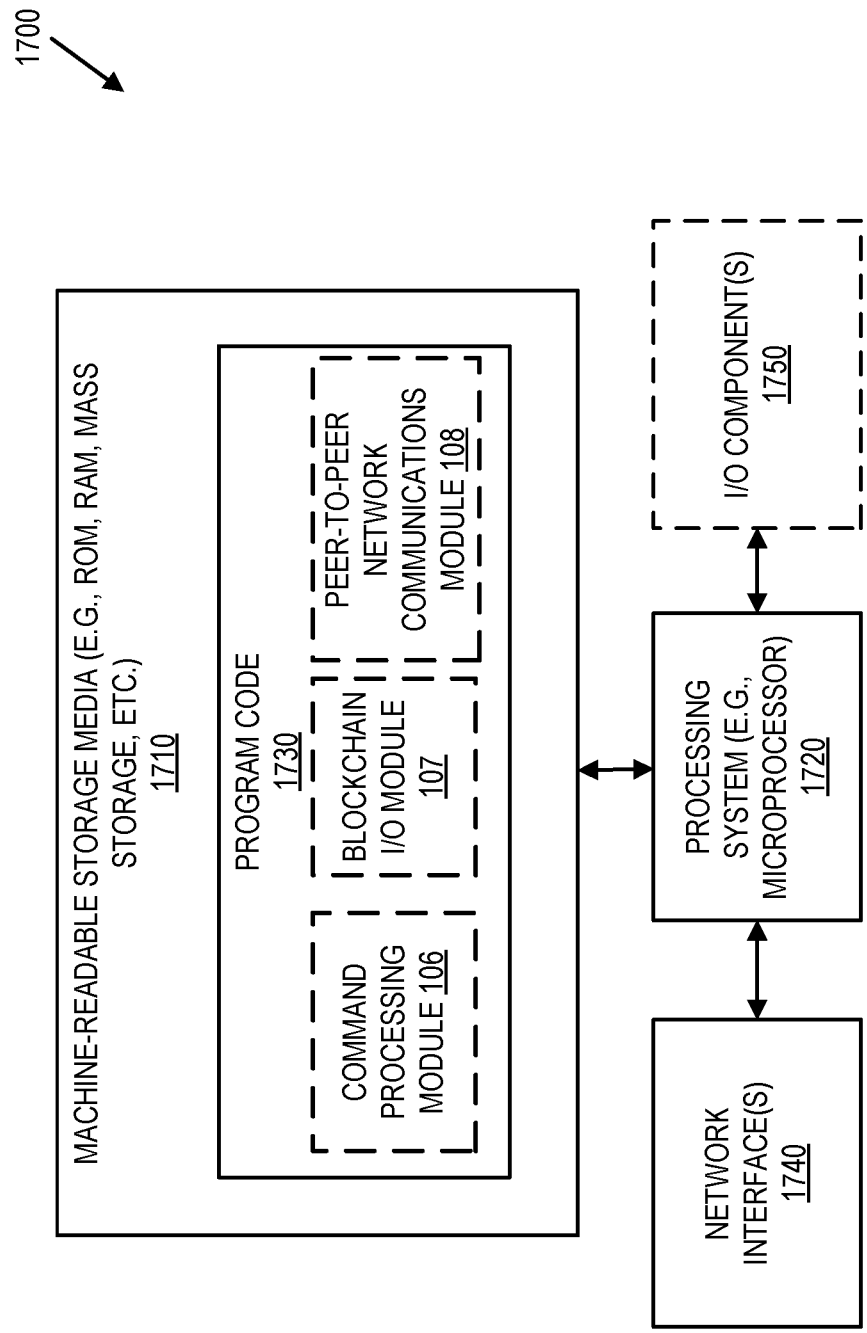
FIG. 17 is a block diagram illustrating a data processing system that can be used in an embodiment.

FIG. 17 illustrates a block diagram for an exemplary data processing system 1700 that may be used in some embodiments. One or more such data processing systems 1700 may be utilized to implement the embodiments and operations described with respect to the relational blockchain database server 105. Data processing system 1700 includes a processing system 1720 (e.g., one or more processors and connected system components such as multiple connected chips).

The data processing system 1700 is an electronic device that stores and transmits (internally and/or with other electronic devices over a network) code (which is composed of software instructions and which is sometimes referred to as computer program code or a computer program) and/or data using machine-readable media (also called computer-readable media), such as machine-readable storage media 1710 (e.g., magnetic disks, optical disks, read only memory (ROM), flash memory devices, phase change memory) and machine-readable transmission media (also called a carrier) (e.g., electrical, optical, radio, acoustical or other form of propagated signals—such as carrier waves, infrared signals), which is coupled to the processing system 1720. For example, the depicted machine-readable storage media 1710 may store program code 1730 that, when executed by the processor(s) 1720, causes the data processing system 1700 to execute the command processing module 106, the blockchain I/O module 107, the peer-to-peer network communications module 108, and/or any of the operations described herein.

The data processing system 1700 also includes one or more network interfaces 1740 (e.g., a wired and/or wireless interfaces) that allows the data processing system 1700 to transmit data and receive data from other computing devices, typically across one or more networks (e.g., Local Area Networks (LANs), the Internet, etc.). The data processing system 1700 may also include one or more input or output ("I/O") components 1750 such as a mouse, keypad, keyboard, a touch panel or a multi-touch input panel, camera, frame grabber, optical scanner, an audio input/output subsystem (which may include a microphone and/or a speaker), other known I/O devices or a combination of such I/O devices. Additional components, not shown, may also be part of the system 1700, and, in certain embodiments, fewer components than that shown in FIG. 17 may also be used in a data processing system 1700. One or more buses may be used to interconnect the various components shown in FIG. 17.

The techniques shown in the figures can be implemented using code and data stored and executed on one or more computing devices (e.g., client devices, servers, etc.). Such computing devices store and communicate (internally and/or with other computing devices over a network) code and data using machine-readable media, such as machine-readable storage media (e.g., magnetic disks; optical disks; random access memory; read only memory; flash memory devices; phase-change memory) and machine-readable communication media (e.g., electrical, optical, acoustical or other form of propagated signals—such as carrier waves, infrared signals, digital signals, etc.). In addition, such computing devices typically include a set of one or more processors coupled to one or more other components, such as one or more storage devices, user input/output devices (e.g., a keyboard, a touchscreen, and/or a display), and network connections. The coupling of the set of processors and other components is typically through one or more busses and bridges (also termed as bus controllers). The storage device and signals carrying the network traffic respectively represent one or more machine-readable storage media and machine-readable communication media. Thus, the storage device of a given computing device typically stores code and/or data for execution on the set of one or more processors of that computing device. Of course, one or more parts of an embodiment of the invention may be implemented using different combinations of software, firmware, and/or hardware.

In the preceding description, numerous specific details are set forth. However, it is understood that embodiments of the invention may be practiced without these specific details. In other instances, well-known circuits, structures and techniques have not been shown in detail in order not to obscure the understanding of this description. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the preceding description and the claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

While the flow diagrams in the figures show a particular order of operations performed by certain embodiments of the invention, it should be understood that such order is exemplary (e.g., alternative embodiments may perform the operations in a different order, combine certain operations, overlap certain operations, etc.).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method, comprising:
   creating a user relational blockchain database that includes a set of one or more system-defined user blockchains and a plurality of user-defined blockchains, wherein the set of one or more system-defined user blockchains includes metadata for managing the plurality of user-defined blockchains, wherein each of the plurality of user-defined blockchains includes a set of one or more fields as defined by a user, wherein the metadata for managing the plurality of user-defined blockchains includes a definition for a field type of at least one field in the set of one or more fields, and wherein at least one of the set of one or more fields relates among the plurality of user-defined blockchains;
   receiving a first command to write data to the user relational blockchain database, wherein the first command includes an identification of a first one of the plurality of user-defined blockchains, an identification of at least one of the set of one or more fields of the first one of the plurality of user-defined blockchains, and a value to write for the at least one of the set of one or more fields of the first one of the plurality of user-defined blockchains;
   generating a first new block for the identified first one of the plurality of user-defined blockchains, the first new block including the value set for the identified at least one of the set of one or more fields of the first one of the plurality of user-defined blockchains;
   transmitting the first new block to a distributed network of blockchain database servers for consensus to add the first new block to the identified first one of the plurality of user-defined blockchains;
   persisting the first new block to the identified first one of the plurality of user-defined blockchains;
   receiving a second command to read data from the user relational blockchain database, wherein the second command includes an identification of the first one of the plurality of user-defined blockchains and an identification of at least one of the set of one or more fields of the first one of the plurality of user-defined blockchains;
   accessing a value of the identified at least one of the set of one or more fields of the first one of the plurality of user-defined blockchains; and
   returning the accessed value.

2. The method of claim 1, further comprising:
   creating a system relational blockchain database that includes a set of one or more management blockchains, wherein the set of one or more management blockchains includes metadata for managing a plurality of user relational blockchain databases, wherein each of the set of one or more management blockchains includes a second set of one or more fields as defined by a system administrator, and wherein at least one of the second set of one or more fields relates among the set of one or more management blockchains.

3. The method of claim 1, further comprising:
receiving a third command to read data from the user relational blockchain database, wherein the third command includes an identification of a first field of the first one of the plurality of user-defined blockchains and an identification of a second field of a second one of the plurality of user-defined blockchains, wherein the first field of the first one of the plurality of user-defined blockchains and the second field of the second one of the plurality of user-defined blockchains relate;
performing a join operation using the first field of the first one of the plurality of user-defined blockchains and the second field of the second one of the plurality of user-defined blockchains; and
returning a result of the join operation and third command.

4. The method of claim 1, further comprising:
receiving a third command to detach the first one of the plurality of user-defined blockchains, wherein the third command includes the identification of the first one of the plurality of user-defined blockchains; and
generating a second new block to a system-defined user blockchains blockchain, wherein the second new block specifies that the first one of the plurality of user-defined blockchains is no longer to be referenced and queried;
transmitting the second new block to a distributed network of blockchain database servers for consensus to add the system-defined user blockchains blockchain; and
persisting the second new block to system-defined user blockchains blockchain.

5. The method of claim 1, further comprising:
receiving a third command to attach a different user-defined blockchain to the user relational blockchain database, wherein the third command includes an identification of the different user-defined blockchain;
generating a second new block to a system-defined user blockchains blockchain, wherein the second new block specifies that the different user-defined blockchain is able to be referenced and queried;
transmitting the second new block to a distributed network of blockchain database servers for consensus to add the system-defined user blockchains blockchain; and
persisting the second new block to system-defined user blockchains blockchain.

6. The method of claim 1, wherein prior to transmitting the new block to the distributed network of blockchain database servers for consensus to add the new block to the identified first one of the plurality of user-defined blockchains, receiving a third command that provides an instruction to transmit the new block to the distributed network of blockchain database servers for consensus, wherein the third command includes an identification of the first one of the plurality of user-defined blockchains.

7. The method of claim 1, wherein transmitting the new block to the distributed network of blockchain database servers for consensus is performed automatically.

8. A non-transitory machine-readable storage medium that provides instructions that, when executed by a processor, cause said processor to perform operations comprising:
creating a user relational blockchain database that includes a set of one or more system-defined user blockchains and a plurality of user-defined blockchains, wherein the set of one or more system-defined user blockchains includes metadata for managing the plurality of user-defined blockchains, wherein each of the plurality of user-defined blockchains includes a set of one or more fields as defined by a user, wherein the metadata for managing the plurality of user-defined blockchains includes a definition for a field type of at least one field in the set of one or more fields, and wherein at least one of the set of one or more fields relates among the plurality of user-defined blockchains;
receiving a first command to write data to the user relational blockchain database, wherein the first command includes an identification of a first one of the plurality of user-defined blockchains, an identification of at least one of the set of one or more fields of the first one of the plurality of user-defined blockchains, and a value to write for the at least one of the set of one or more fields of the first one of the plurality of user-defined blockchains;
generating a first new block for the identified first one of the plurality of user-defined blockchains, the first new block including the value set for the identified at least one of the set of one or more fields of the first one of the plurality of user-defined blockchains;
transmitting the first new block to a distributed network of blockchain database servers for consensus to add the first new block to the identified first one of the plurality of user-defined blockchains;
persisting the first new block to the identified first one of the plurality of user-defined blockchains;
receiving a second command to read data from the user relational blockchain database, wherein the second command includes an identification of the first one of the plurality of user-defined blockchains and an identification of at least one of the set of one or more fields of the first one of the plurality of user-defined blockchains;
accessing a value of the identified at least one of the set of one or more fields of the first one of the plurality of user-defined blockchains; and
returning the accessed value.

9. The non-transitory machine-readable storage medium of claim 8, wherein the operations further comprise:
creating a system relational blockchain database that includes a set of one or more management blockchains, wherein the set of one or more management blockchains includes metadata for managing a plurality of user relational blockchain databases, wherein each of the set of one or more management blockchains includes a second set of one or more fields as defined by a system administrator, and wherein at least one of the second set of one or more fields relates among the set of one or more management blockchains.

10. The non-transitory machine-readable storage medium of claim 8, wherein the operations further comprise:
receiving a third command to read data from the user relational blockchain database, wherein the third command includes an identification of a first field of the first one of the plurality of user-defined blockchains and an identification of a second field of a second one of the plurality of user-defined blockchains, wherein the first field of the first one of the plurality of user-defined blockchains and the second field of the second one of the plurality of user-defined blockchains relate;

performing a join operation using the first field of the first one of the plurality of user-defined blockchains and the second field of the second one of the plurality of user-defined blockchains; and returning a result of the join operation and third command.

11. The non-transitory machine-readable storage medium of claim 8, wherein the operations further comprise:
receiving a third command to detach the first one of the plurality of user-defined blockchains, wherein the third command includes the identification of the first one of the plurality of user-defined blockchains; and
generating a second new block to a system-defined user blockchains blockchain, wherein the second new block specifies that the first one of the plurality of user-defined blockchains is no longer to be referenced and queried;
transmitting the second new block to a distributed network of blockchain database servers for consensus to add the system-defined user blockchains blockchain; and
persisting the second new block to system-defined user blockchains blockchain.

12. The non-transitory machine-readable storage medium of claim 8, wherein the operations further comprise:
receiving a third command to attach a different user-defined blockchain to the user relational blockchain database, wherein the third command includes an identification of the different user-defined blockchain;
generating a second new block to a system-defined user blockchains blockchain, wherein the second new block specifies that the different user-defined blockchain is able to be referenced and queried;
transmitting the second new block to a distributed network of blockchain database servers for consensus to add the system-defined user blockchains blockchain; and
persisting the second new block to system-defined user blockchains blockchain.

13. The non-transitory machine-readable storage medium of claim 8, wherein prior to transmitting the new block to the distributed network of blockchain database servers for consensus to add the new block to the identified first one of the plurality of user-defined blockchains, the operations further comprise receiving a third command that provides an instruction to transmit the new block to the distributed network of blockchain database servers for consensus, wherein the third command includes an identification of the first one of the plurality of user-defined blockchains.

14. The non-transitory machine-readable storage medium of claim 8, wherein transmitting the new block to the distributed network of blockchain database servers for consensus is performed automatically.

15. An apparatus, comprising:
a processor; and
a non-transitory machine-readable storage medium coupled with the processor that stores instructions that, when executed by the processor, cause said processor to perform the following operations:
create a user relational blockchain database that includes a set of one or more system-defined user blockchains and a plurality of user-defined blockchains, wherein the set of one or more system-defined user blockchains is to include metadata for managing the plurality of user-defined blockchains, wherein each of the plurality of user-defined blockchains is to include a set of one or more fields as defined by a user, wherein the metadata for managing the plurality of user-defined blockchains includes a definition for a field type of at least one field in the set of one or more fields, and wherein at least one of the set of one or more fields is relatable among the plurality of user-defined blockchains;
receive a first command to write data to the user relational blockchain database, wherein the first command is to include an identification of a first one of the plurality of user-defined blockchains, an identification of at least one of the set of one or more fields of the first one of the plurality of user-defined blockchains, and a value to write for the at least one of the set of one or more fields of the first one of the plurality of user-defined blockchains;
generate a first new block for the identified first one of the plurality of user-defined blockchains, the first new block to include the value set for the identified at least one of the set of one or more fields of the first one of the plurality of user-defined blockchains;
transmit the first new block to a distributed network of blockchain database servers for consensus to add the first new block to the identified first one of the plurality of user-defined blockchains;
persist the first new block to the identified first one of the plurality of user-defined blockchains;
receive a second command to read data from the user relational blockchain database, wherein the second command is to include an identification of the first one of the plurality of user-defined blockchains and an identification of at least one of the set of one or more fields of the first one of the plurality of user-defined blockchains;
access a value of the identified at least one of the set of one or more fields of the first one of the plurality of user-defined blockchains; and
return the accessed value.

16. The apparatus of claim 15, wherein the operations further comprise:
create a system relational blockchain database that includes a set of one or more management blockchains, wherein the set of one or more management blockchains is to include metadata for managing a plurality of user relational blockchain databases, wherein each of the set of one or more management blockchains is to includes second set of one or more fields as defined by a system administrator, and wherein at least one of the second set of one or more fields is relatable among the set of one or more management blockchains.

17. The apparatus of claim 15, wherein the operations further comprise:
receive a third command to read data from the user relational blockchain database, wherein the third command is to include an identification of a first field of the first one of the plurality of user-defined blockchains and an identification of a second field of a second one of the plurality of user-defined blockchains, wherein the first field of the first one of the plurality of user-defined blockchains and the second field of the second one of the plurality of user-defined blockchains relate;
perform a join operation using the first field of the first one of the plurality of user-defined blockchains and the second field of the second one of the plurality of user-defined blockchains; and
return a result of the join operation and third command.

18. The apparatus of claim 15, wherein the operations further comprise:

receive a third command to detach the first one of the plurality of user-defined blockchains, wherein the third command is to include the identification of the first one of the plurality of user-defined blockchains; and generate a second new block to a system-defined user blockchains blockchain, wherein the second new block is to specify that the first one of the plurality of user-defined blockchains is no longer to be referenced and queried;

transmit the second new block to a distributed network of blockchain database servers for consensus to add the system-defined user blockchains blockchain; and persist the second new block to system-defined user blockchains blockchain.

19. The apparatus of claim 15, wherein the operations further comprise:

receive a third command to attach a different user-defined blockchain to the user relational blockchain database, wherein the third command is to include an identification of the different user-defined blockchain;

generate a second new block to a system-defined user blockchains blockchain, wherein the second new block specifies that the different user-defined blockchain is able to be referenced and queried;

transmit the second new block to a distributed network of blockchain database servers for consensus to add the system-defined user blockchains blockchain; and persist the second new block to system-defined user blockchains blockchain.

20. The apparatus of claim 15, wherein prior to transmission of the new block to the distributed network of blockchain database servers for consensus to add the new block to the identified first one of the plurality of user-defined blockchains, the operations further comprise receive a third command that provides an instruction to transmit the new block to the distributed network of blockchain database servers for consensus, wherein the third command is to include an identification of the first one of the plurality of user-defined blockchains.

21. The apparatus of claim 15, wherein transmission of the new block to the distributed network of blockchain database servers for consensus is to be performed automatically.

* * * * *